US012695185B2

(12) United States Patent
Park et al.

(10) Patent No.: US 12,695,185 B2
(45) Date of Patent: Jul. 28, 2026

(54) CLAMPING APPARATUS FOR ANTENNA

(71) Applicant: KMW INC., Hwaseong-si (KR)

(72) Inventors: Dae Myung Park, Hwaseong-si (KR); Young Ji Hong, Hwaseong-si (KR); Hee Kim, Osan-si (KR)

(73) Assignee: KMW INC., Hwaseong-si (KR)

( * ) Notice: Subject to any disclaimer, the term of this patent is extended or adjusted under 35 U.S.C. 154(b) by 0 days.

(21) Appl. No.: 18/966,141

(22) Filed: Dec. 3, 2024

(65) Prior Publication Data

US 2025/0096457 A1 Mar. 20, 2025

Related U.S. Application Data

(63) Continuation of application No. PCT/KR2023/006522, filed on May 15, 2023.

(30) Foreign Application Priority Data

Jun. 3, 2022 (KR) ........................ 10-2022-0068546
May 12, 2023 (KR) ........................ 10-2023-0061957

(51) Int. Cl.
*H01Q 3/08* (2006.01)
*H01Q 1/12* (2006.01)

(52) U.S. Cl.
CPC .................................... *H01Q 3/08* (2013.01)

(58) Field of Classification Search
CPC ........ H01Q 1/12; H01Q 1/1228; H01Q 1/125; H01Q 1/1264; H01Q 1/24; H01Q 1/246; H01Q 3/08
See application file for complete search history.

(56) References Cited

U.S. PATENT DOCUMENTS 3,412,404 A 11/1968 Bergling
9,972,906 B2 5/2018 Vassilakis
(Continued)

FOREIGN PATENT DOCUMENTS

CN 111969292 A 11/2020
CN 212412182 U 1/2021
(Continued)

OTHER PUBLICATIONS

International Search Report mailed on Aug. 22, 2023 for International Application No. PCT/KR2023/006522 and its English translation.
(Continued)

*Primary Examiner* — Hoang V Nguyen

(57) ABSTRACT

The present invention relates to a clamping apparatus for an antenna, the clamping apparatus including fixing bracket parts provided at upper and lower sides of a support pole to mediate installation of an antenna device on the support pole, an antenna installation bracket configured to mediate installation of the antenna device at a front side, a steering driving unit connected to the fixing bracket part and configured to operate to steer and rotate the antenna device, and a tilting driving unit having an upper end hingedly connected to the steering driving unit and a lower end hingedly connected to an upper end of a rear surface of the antenna installation bracket by means of a pair of tilting link members, the tilting driving unit being configured to tilt and rotate the antenna device, in which the clamping apparatus may further include a backlash reduction design shape for reducing the occurrence of mechanical backlash noise caused by an eccentric load of the antenna device, thereby suppressing the occurrence of backlash noise.

13 Claims, 27 Drawing Sheets

(56) References Cited

U.S. PATENT DOCUMENTS

| | | | | |
|---|---|---|---|---|
| 10,777,873 | B2 * | 9/2020 | Britz | H01Q 1/1228 |
| 2015/0236397 | A1 | 8/2015 | Son et al. | |
| 2016/0211576 | A1 * | 7/2016 | Vassilakis | H01Q 1/1228 |
| 2020/0194884 | A1 * | 6/2020 | Clifford | H01Q 1/125 |
| 2021/0111474 | A1 * | 4/2021 | Kolokotronis | H01Q 3/06 |
| 2022/0123455 | A1 | 4/2022 | Kang et al. | |

FOREIGN PATENT DOCUMENTS

| | | | |
|---|---|---|---|
| CN | 216389728 | U | 4/2022 |
| KR | 10-2095871 | B | 4/2020 |
| KR | 10-2206659 | B1 | 1/2021 |
| KR | 10-2021-0102085 | A | 8/2021 |
| KR | 10-2022-0015959 | A | 2/2022 |
| WO | 2021/158075 | A1 | 8/2021 |

OTHER PUBLICATIONS

Office Action mailed on Nov. 18, 2025 from Japanese Patent Office for Application No. 2024-570695.

European Search Report dated Apr. 16, 2026 from the European Patent Office for Application No. 23816252.3.

* cited by examiner

[FIG. 1A]
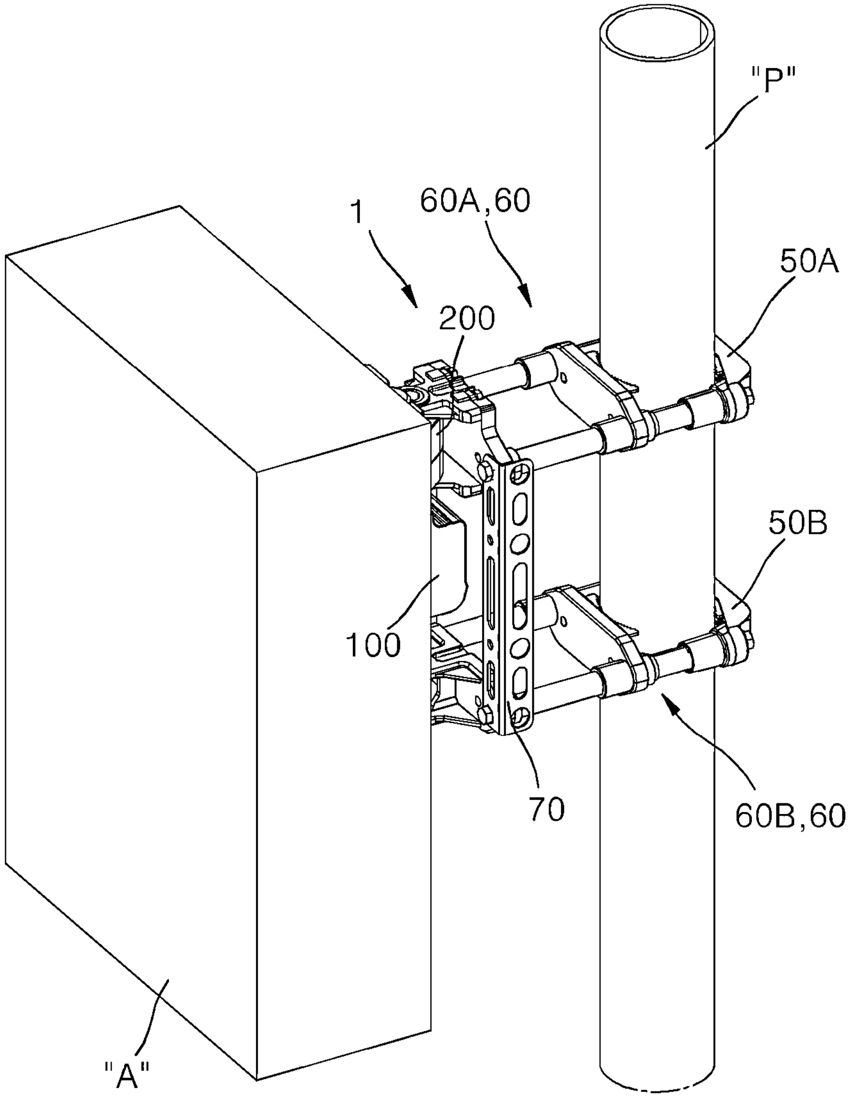

[FIG. 1B]
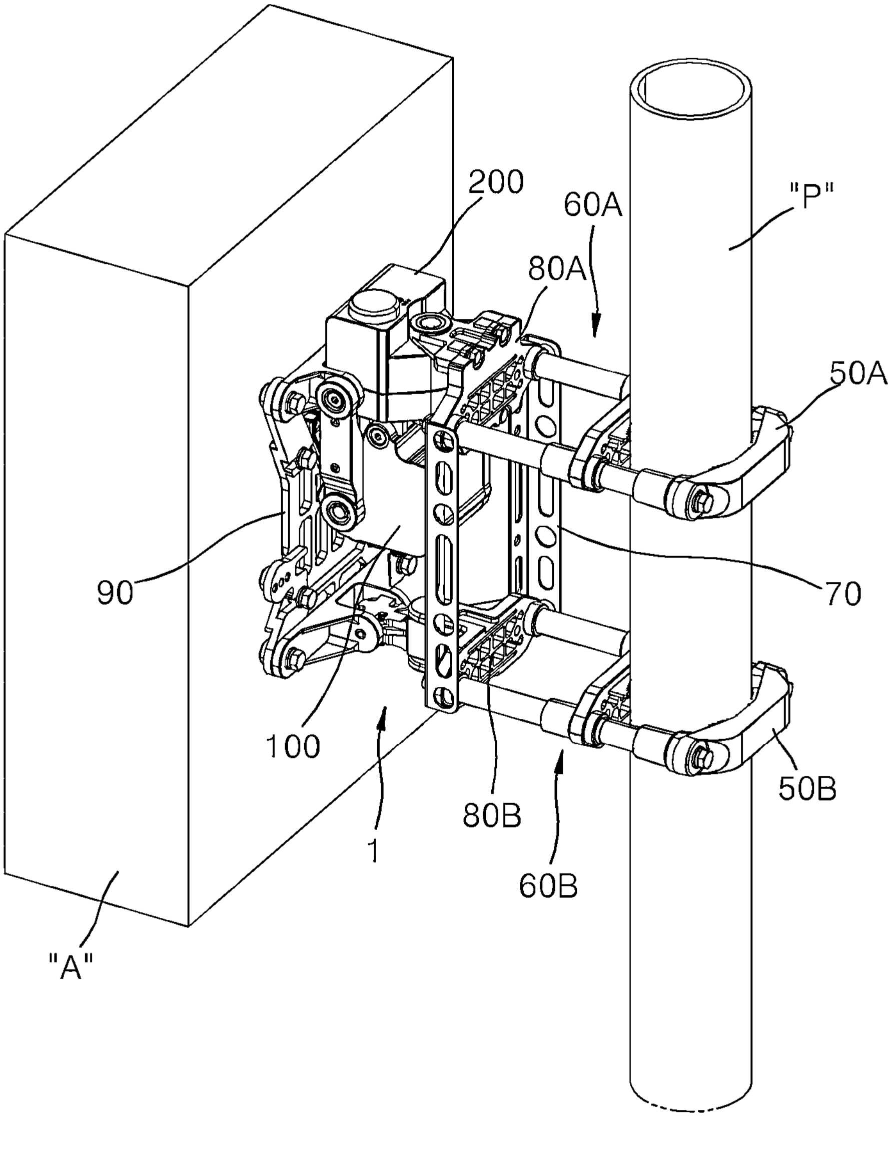

[FIG. 2A]
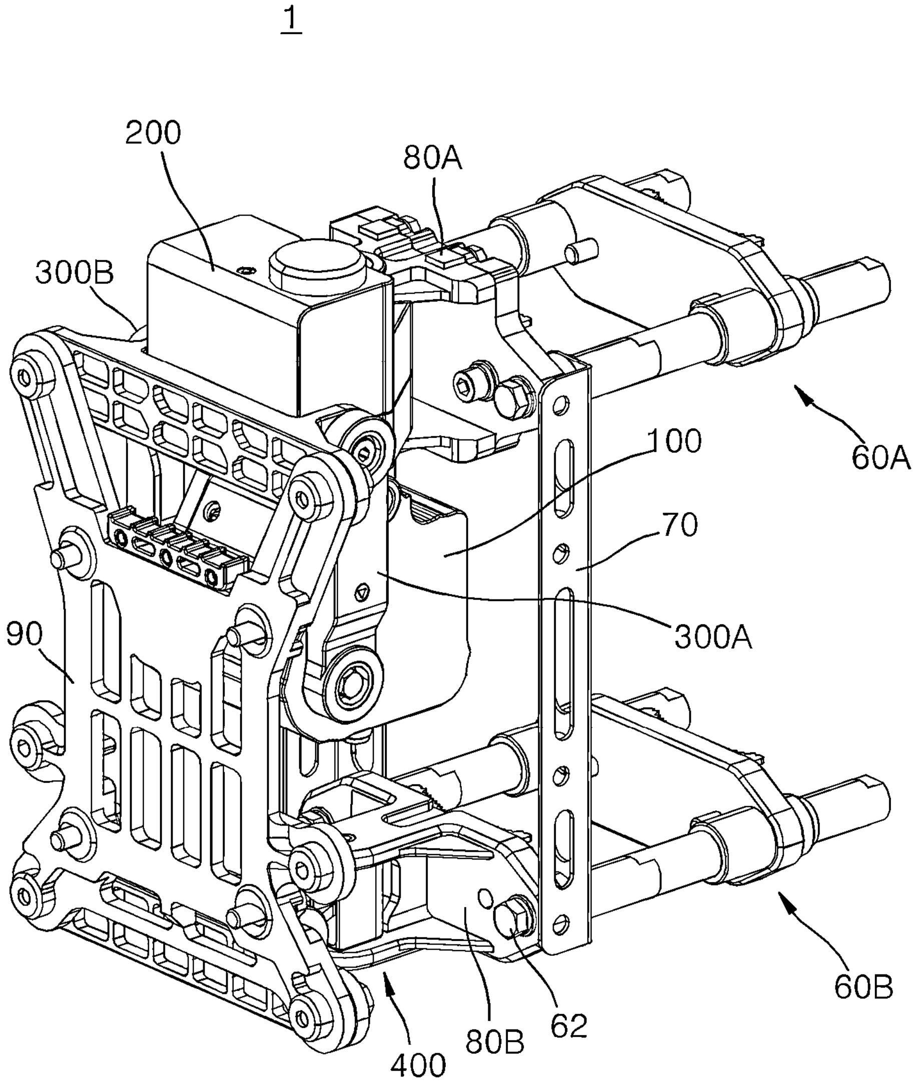

[FIG. 2B]
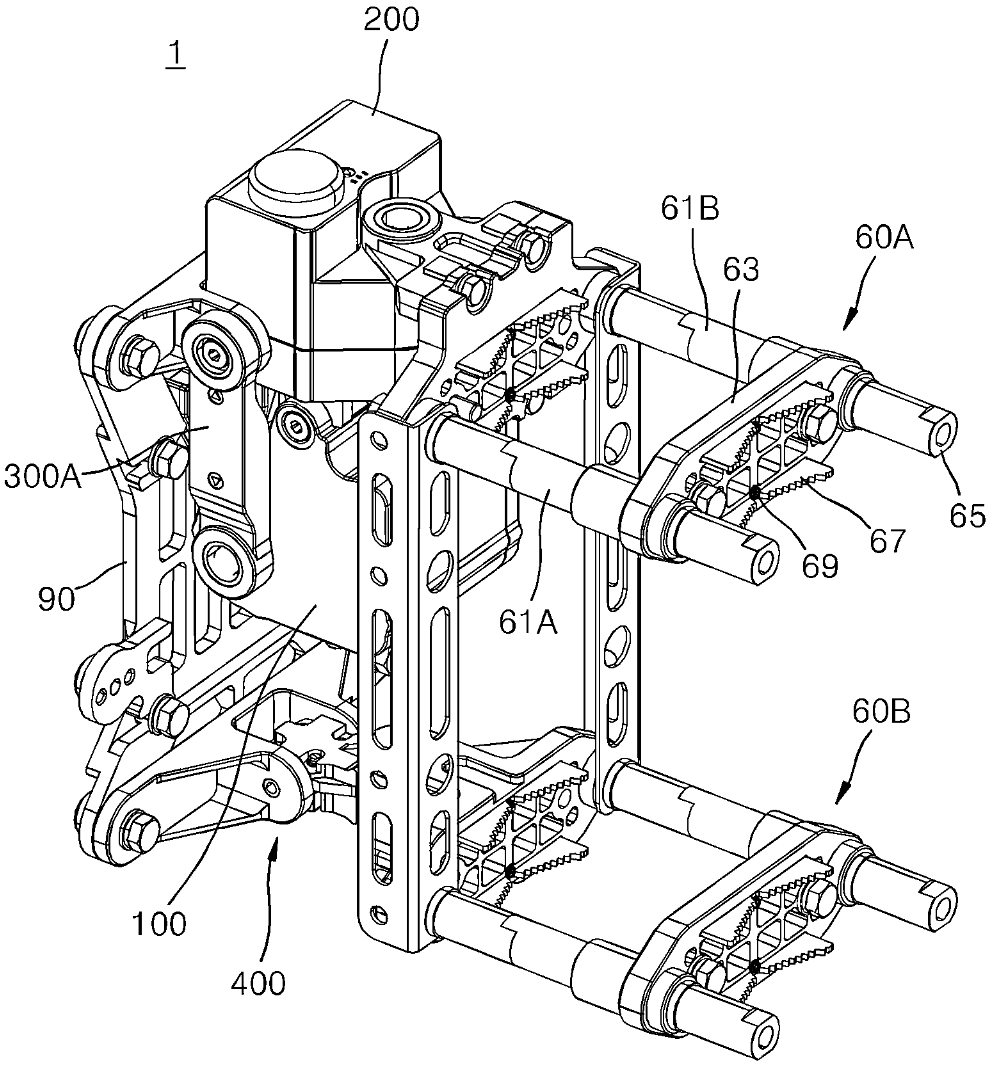

[FIG. 3A]
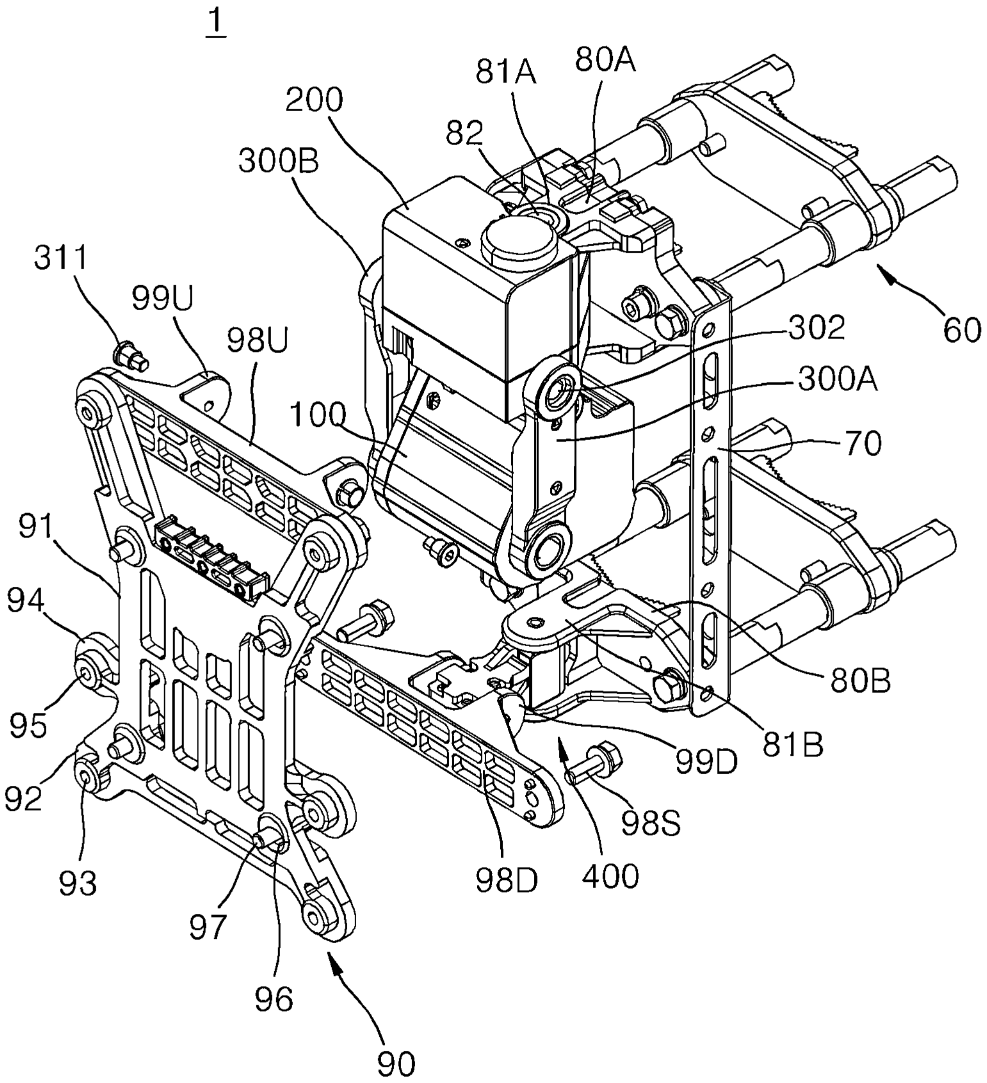

[FIG. 3B]
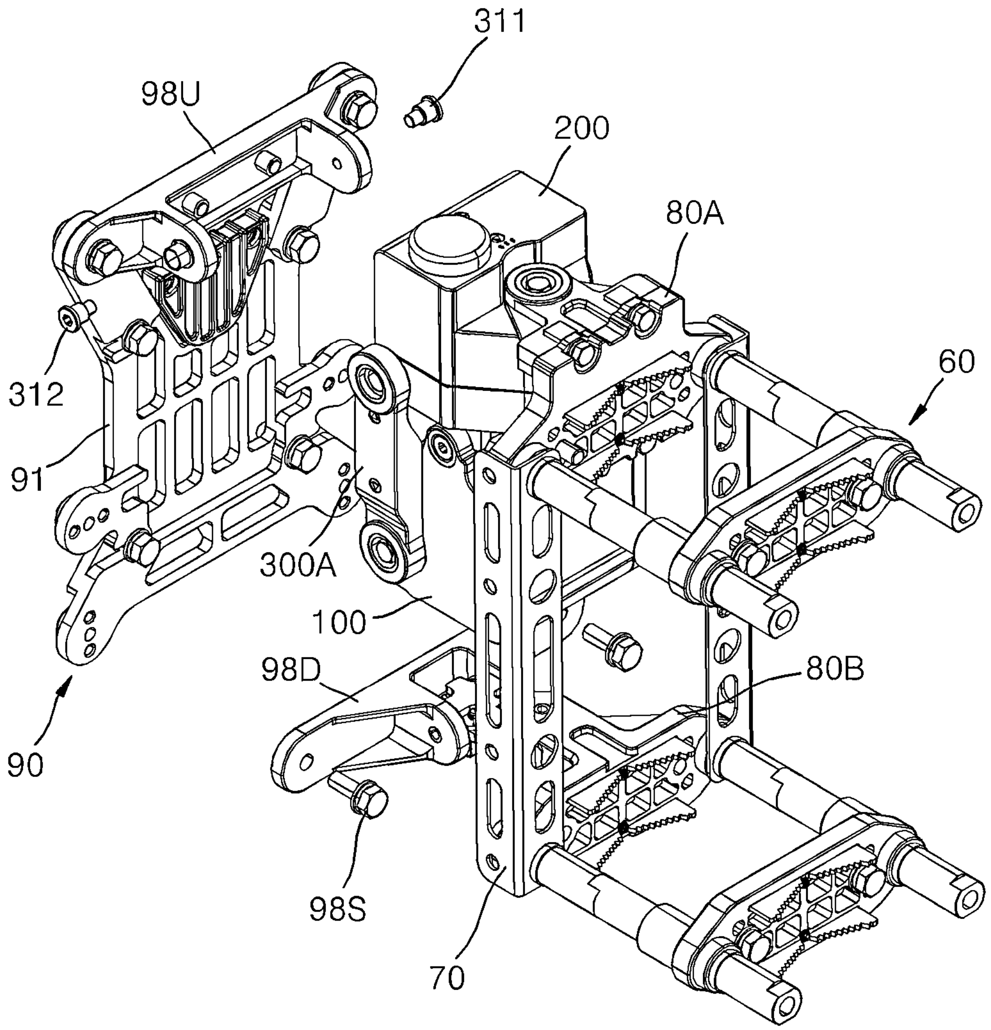

[FIG. 4A]
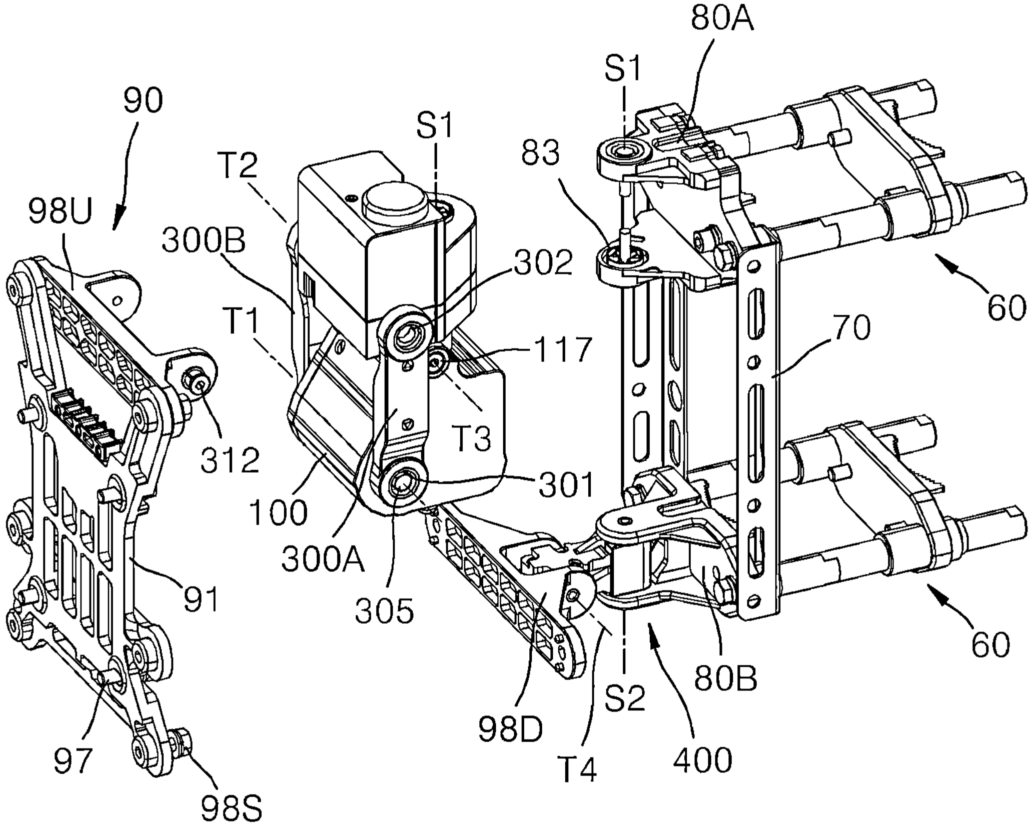

[FIG. 4B]
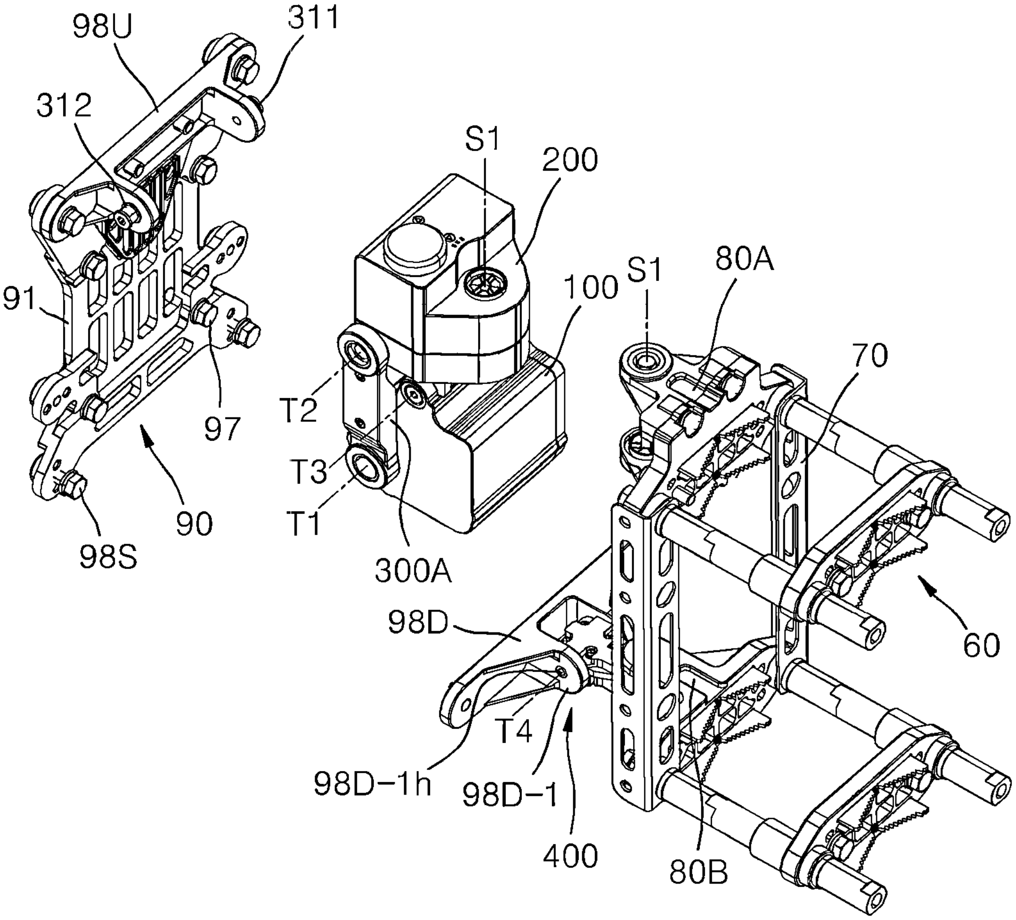

[FIG. 5A]
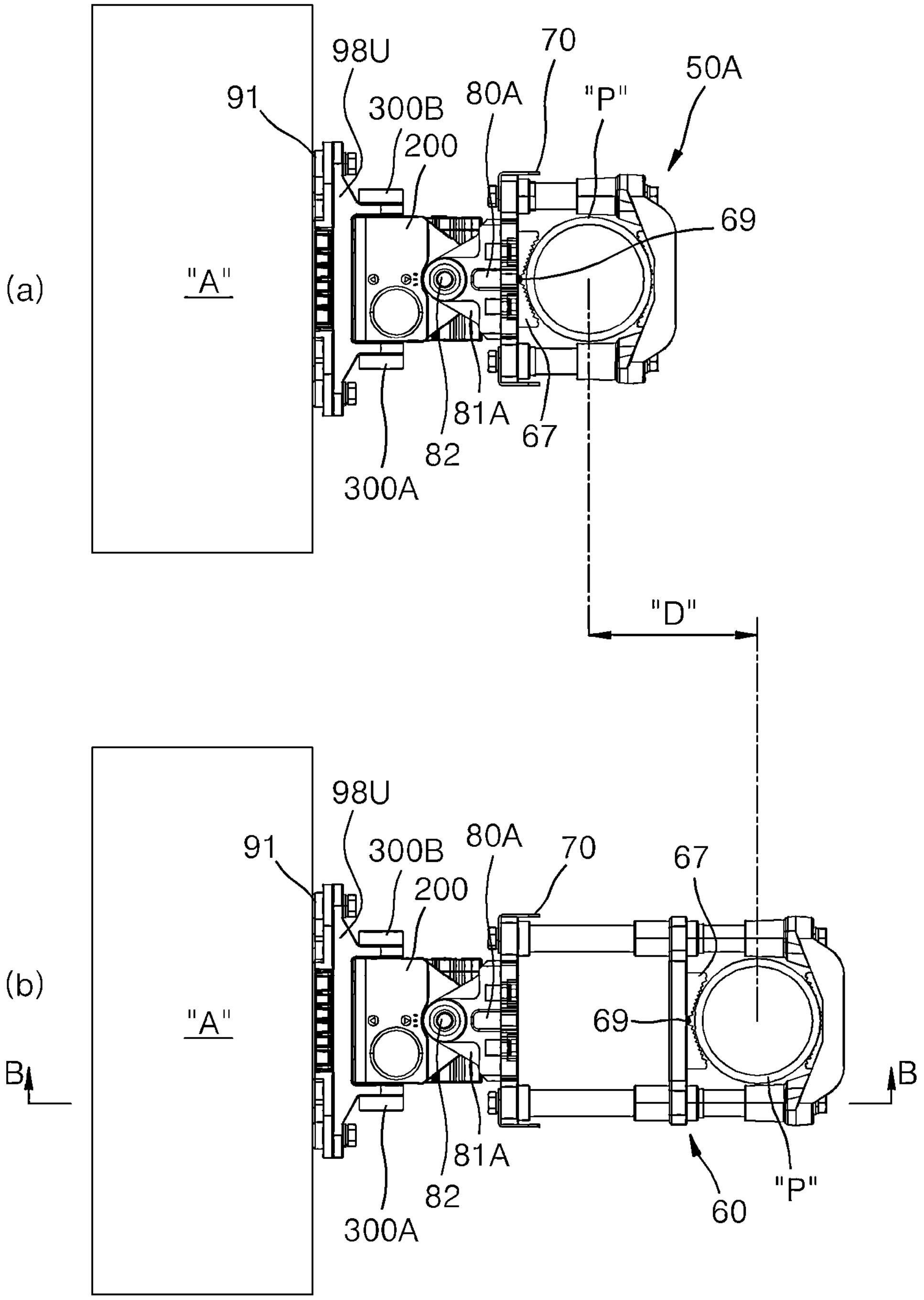

[FIG. 5B]
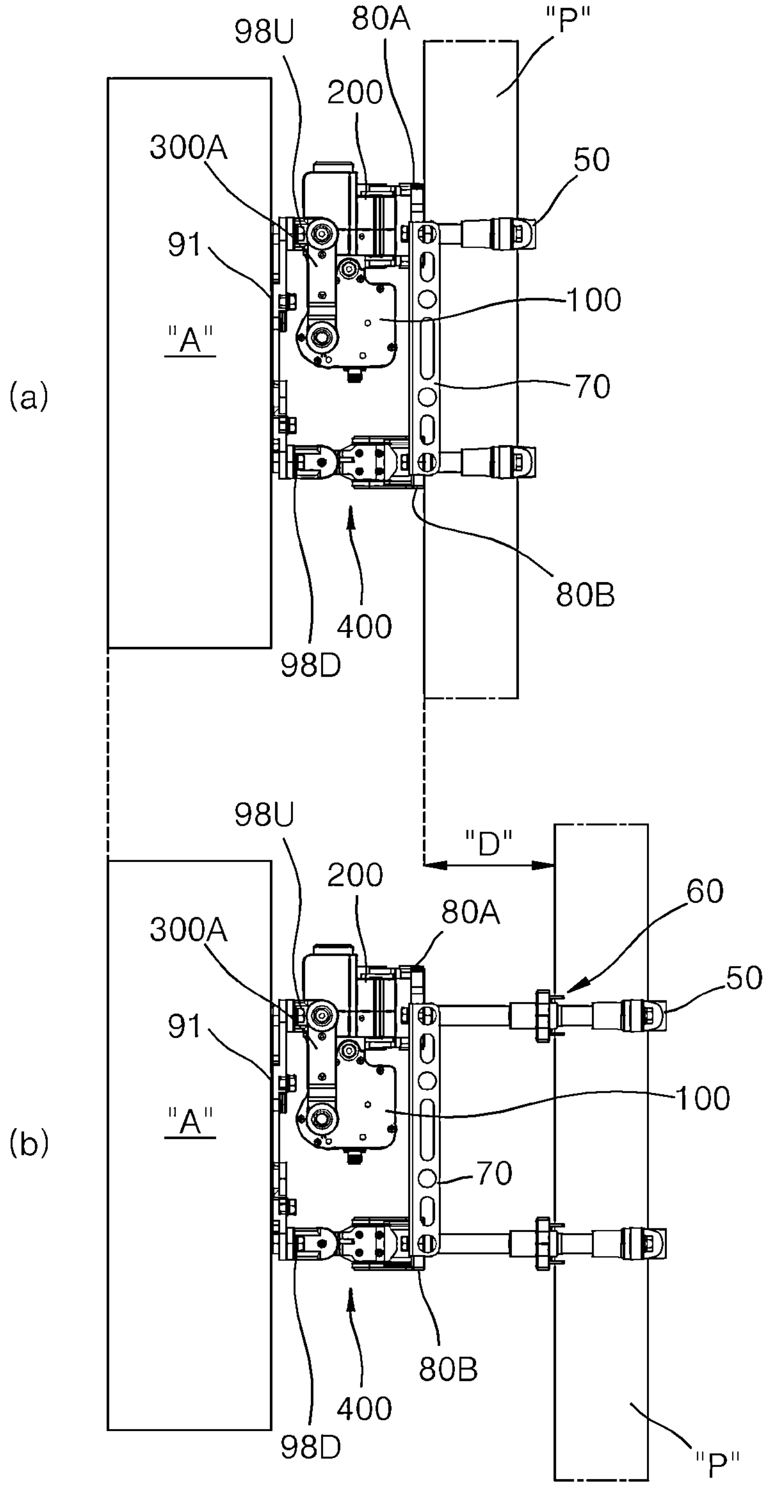

[FIG. 5C]
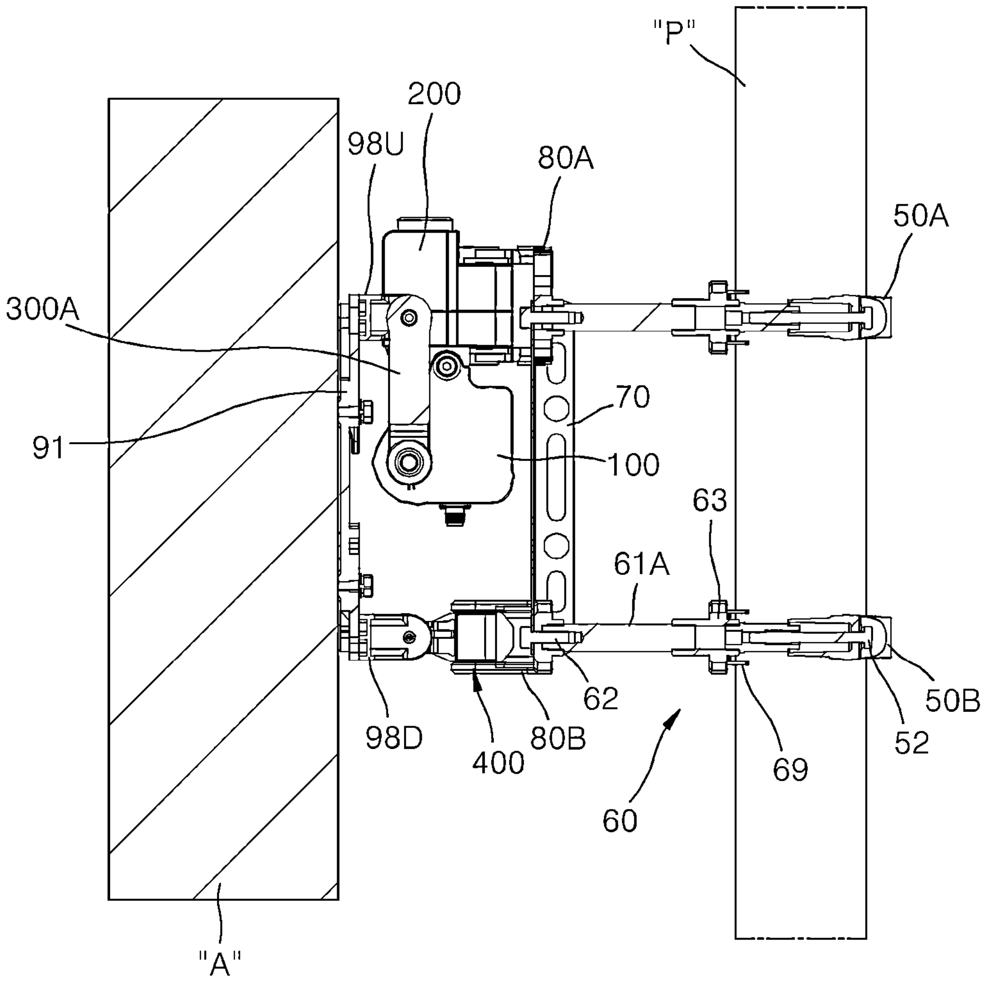

[FIG. 6]
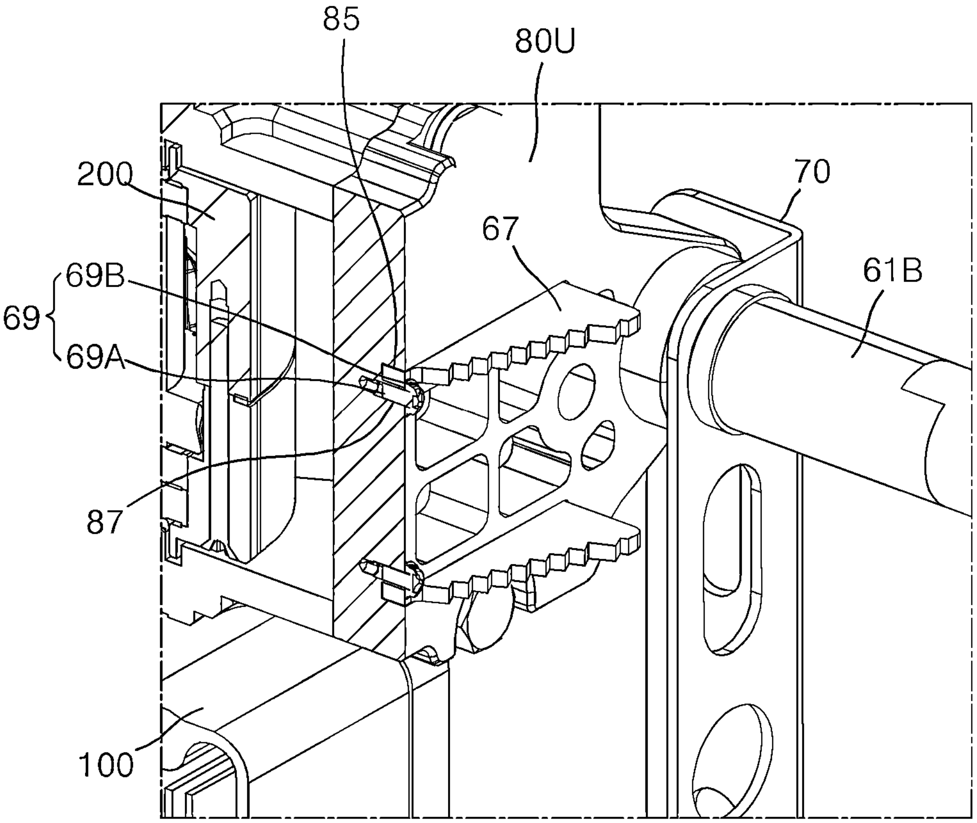

[FIG. 7]
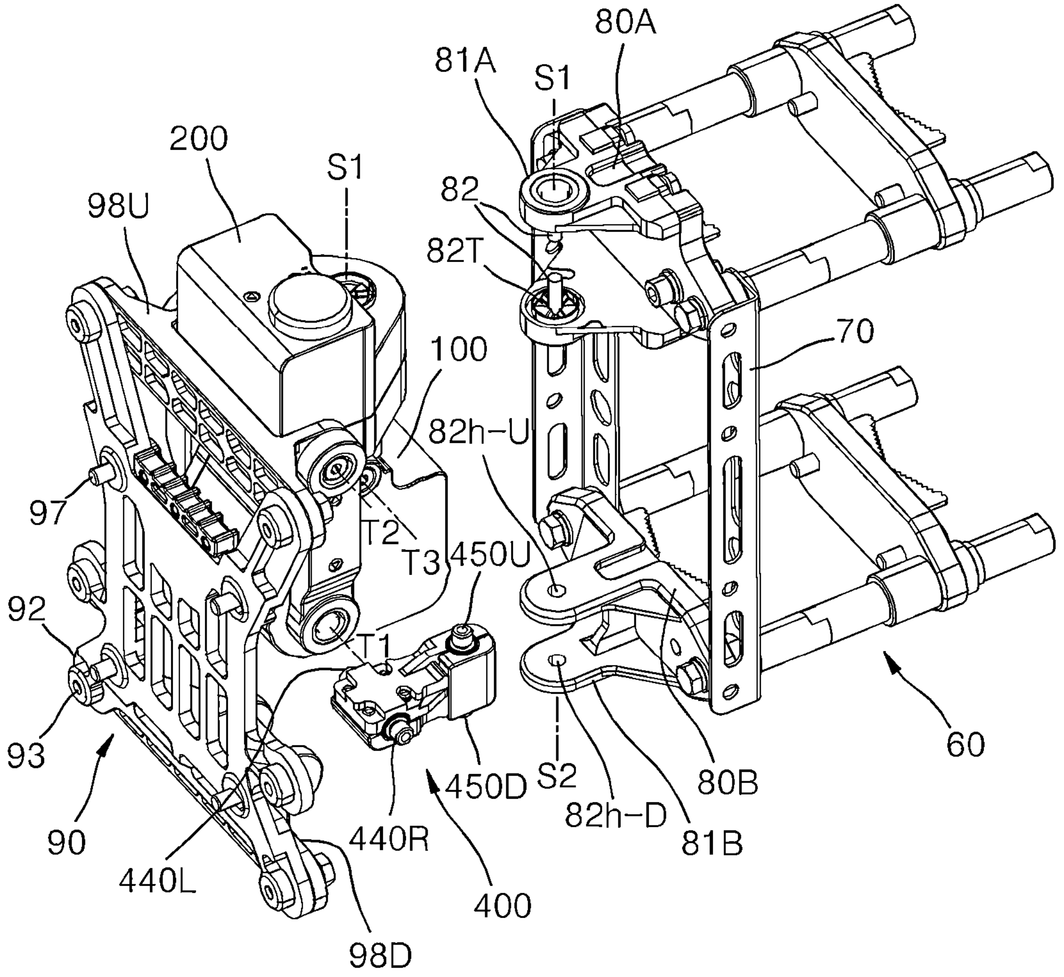

[FIG. 8A]
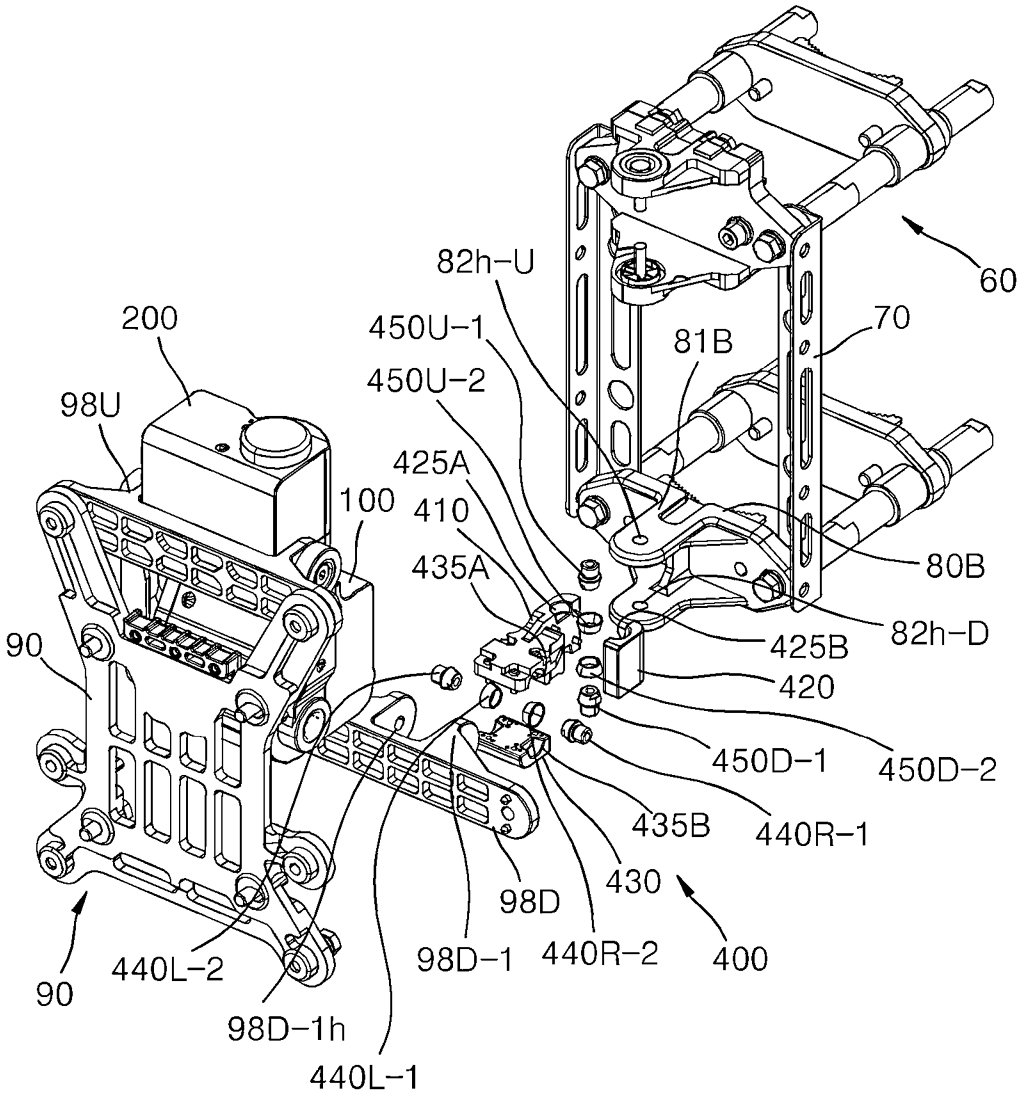

[FIG. 8B]
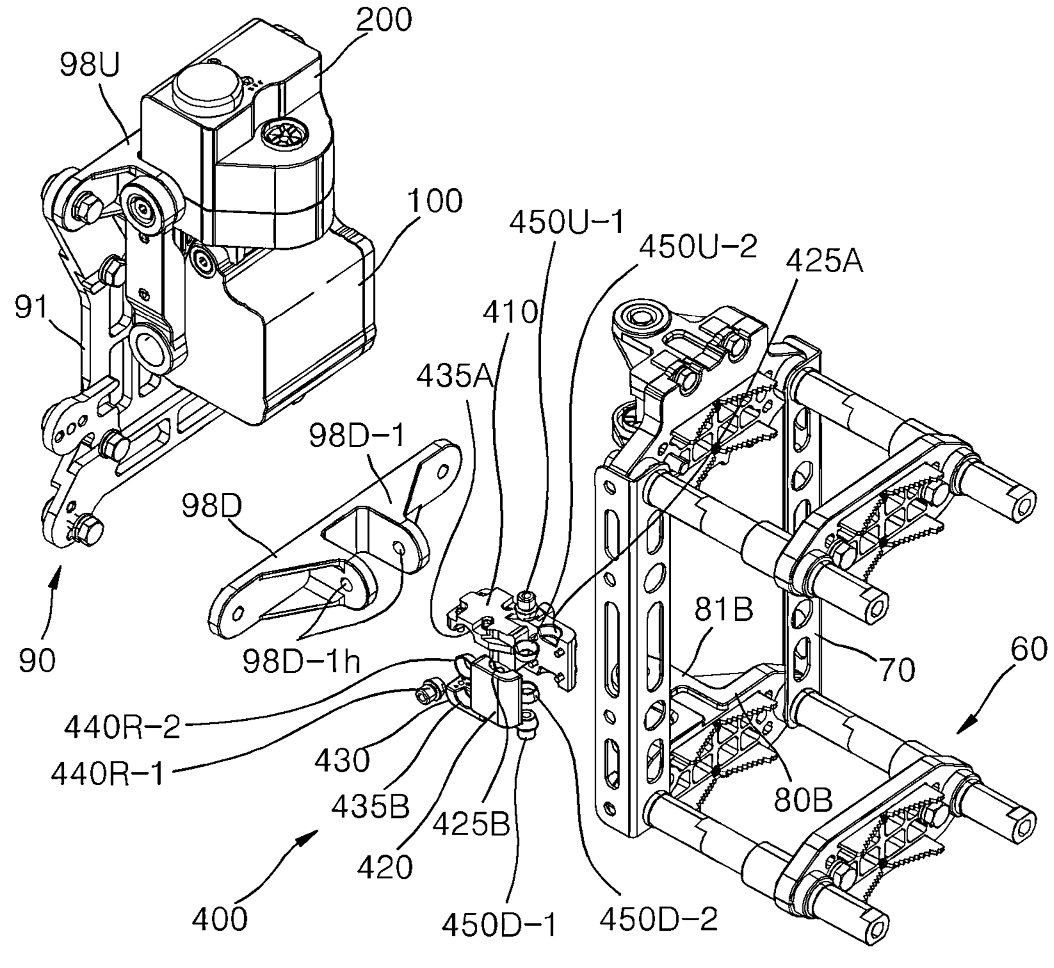

[FIG. 9]
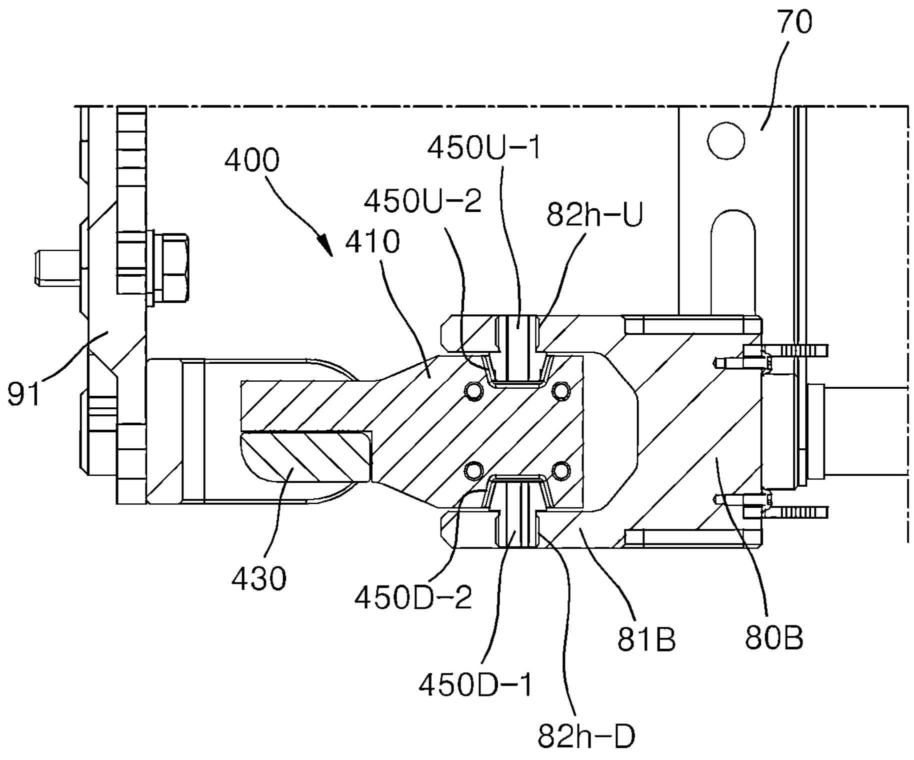

[FIG. 10A]
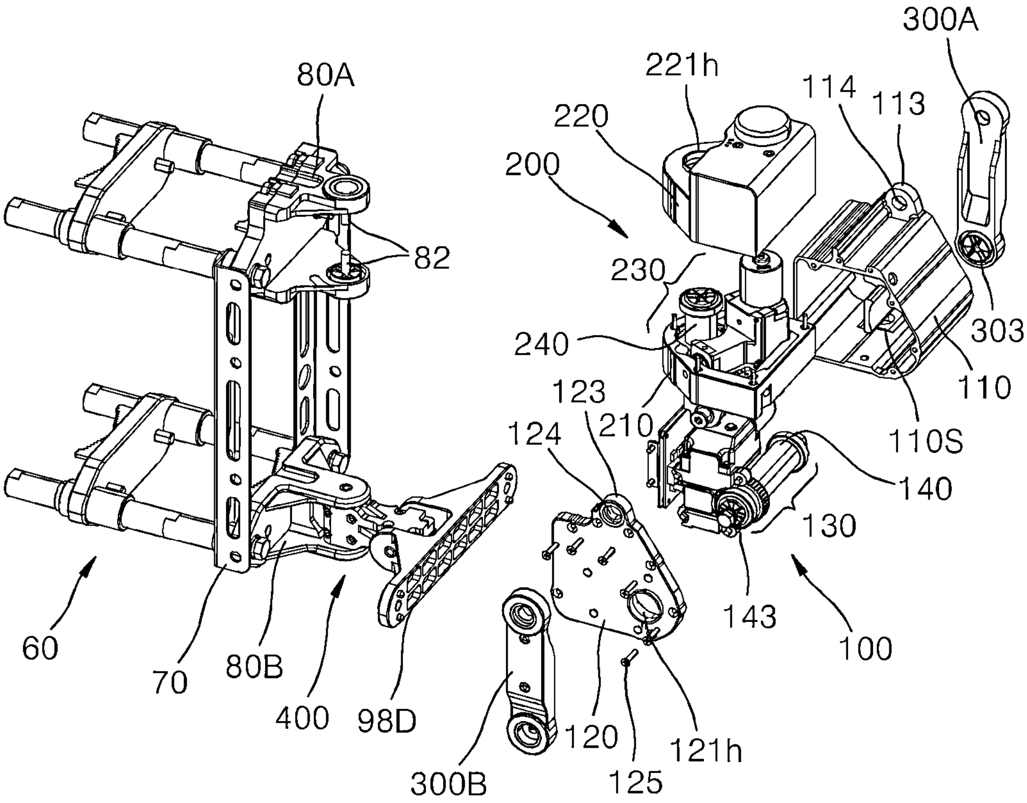

[FIG. 10B]
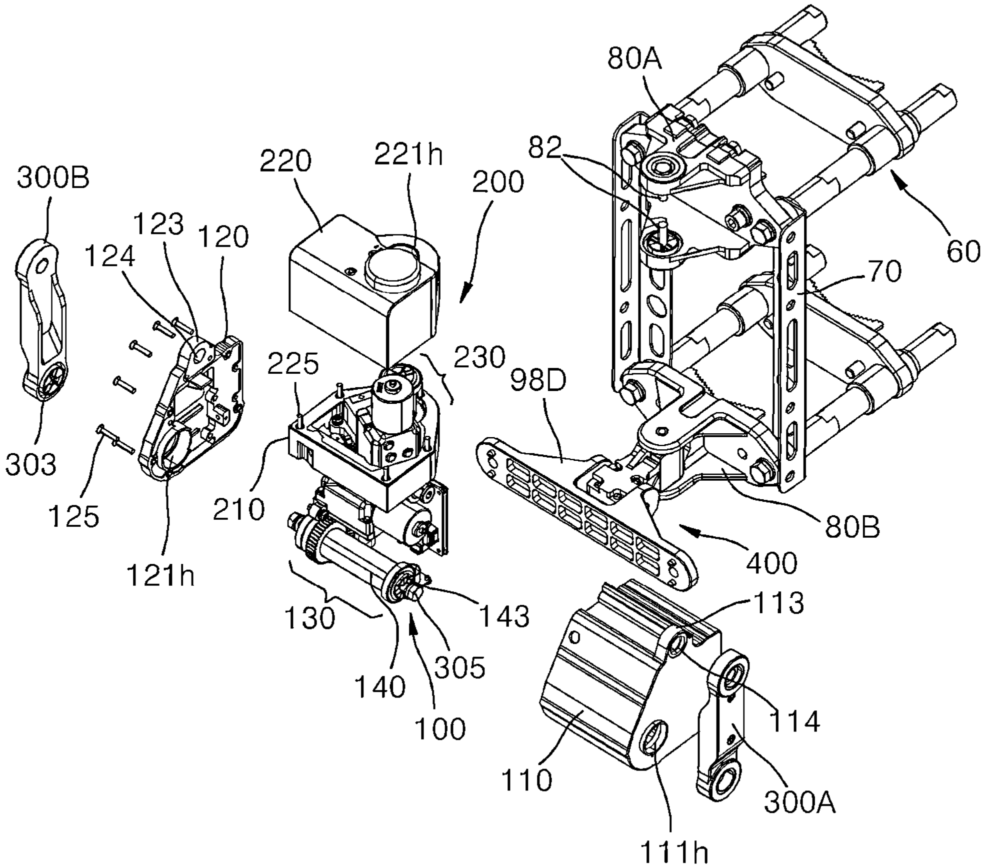

[FIG. 11A]
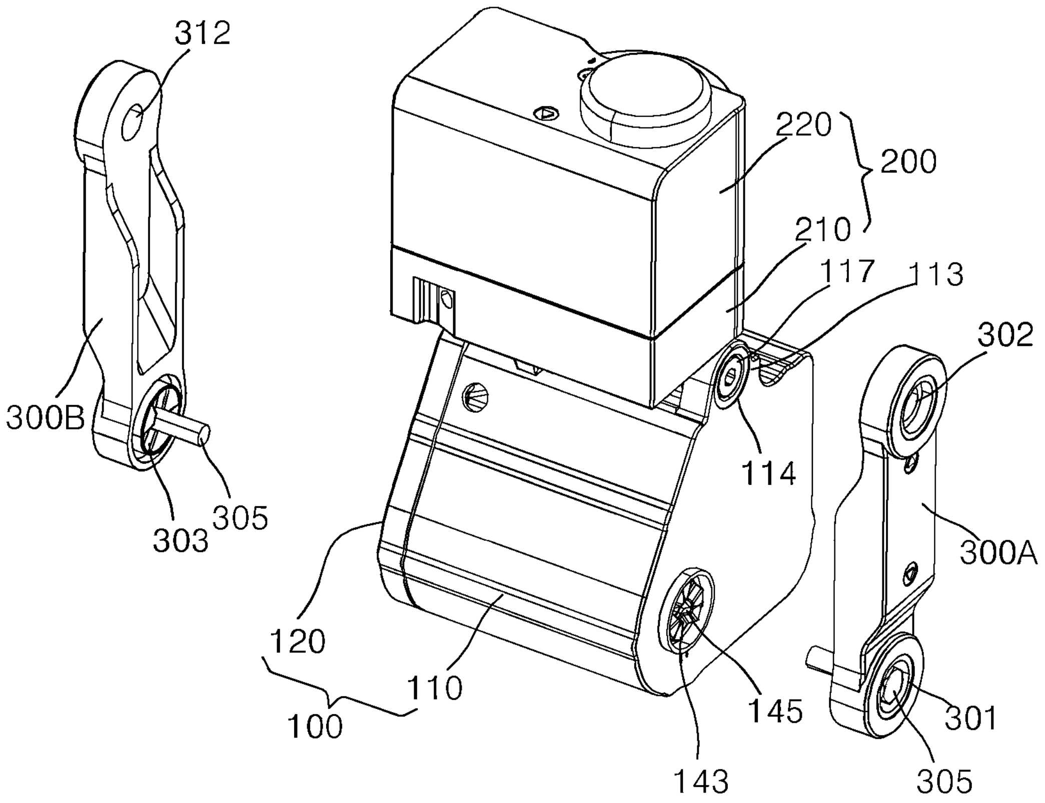

[FIG. 11B]
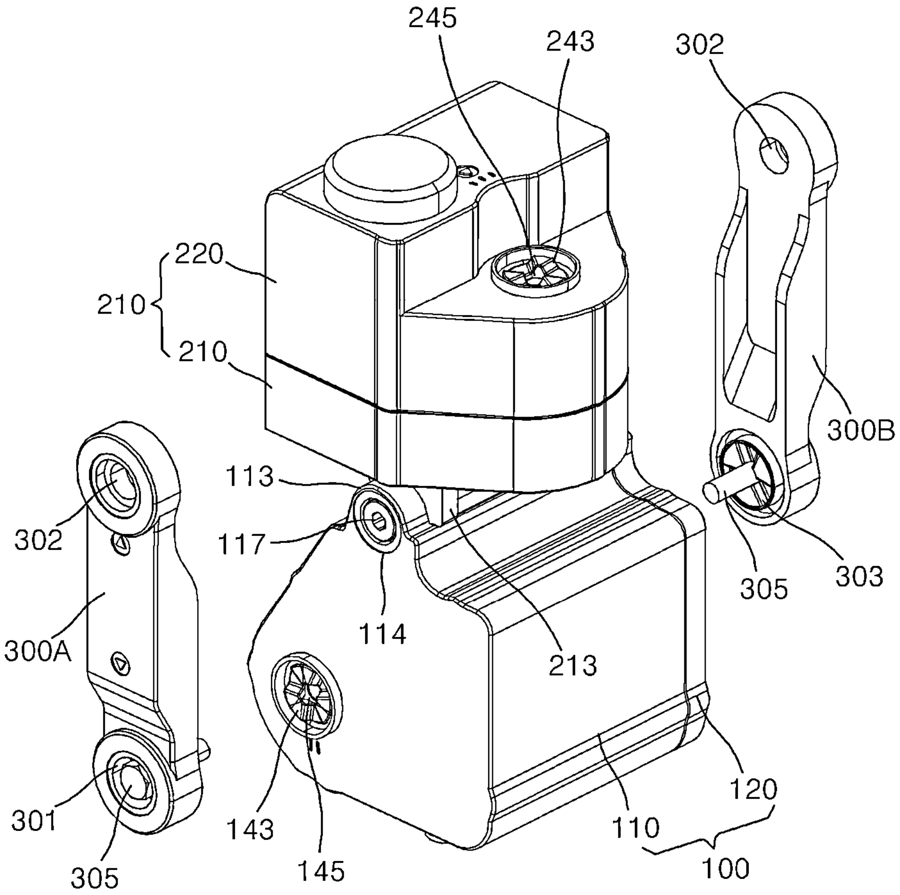

[FIG. 12]
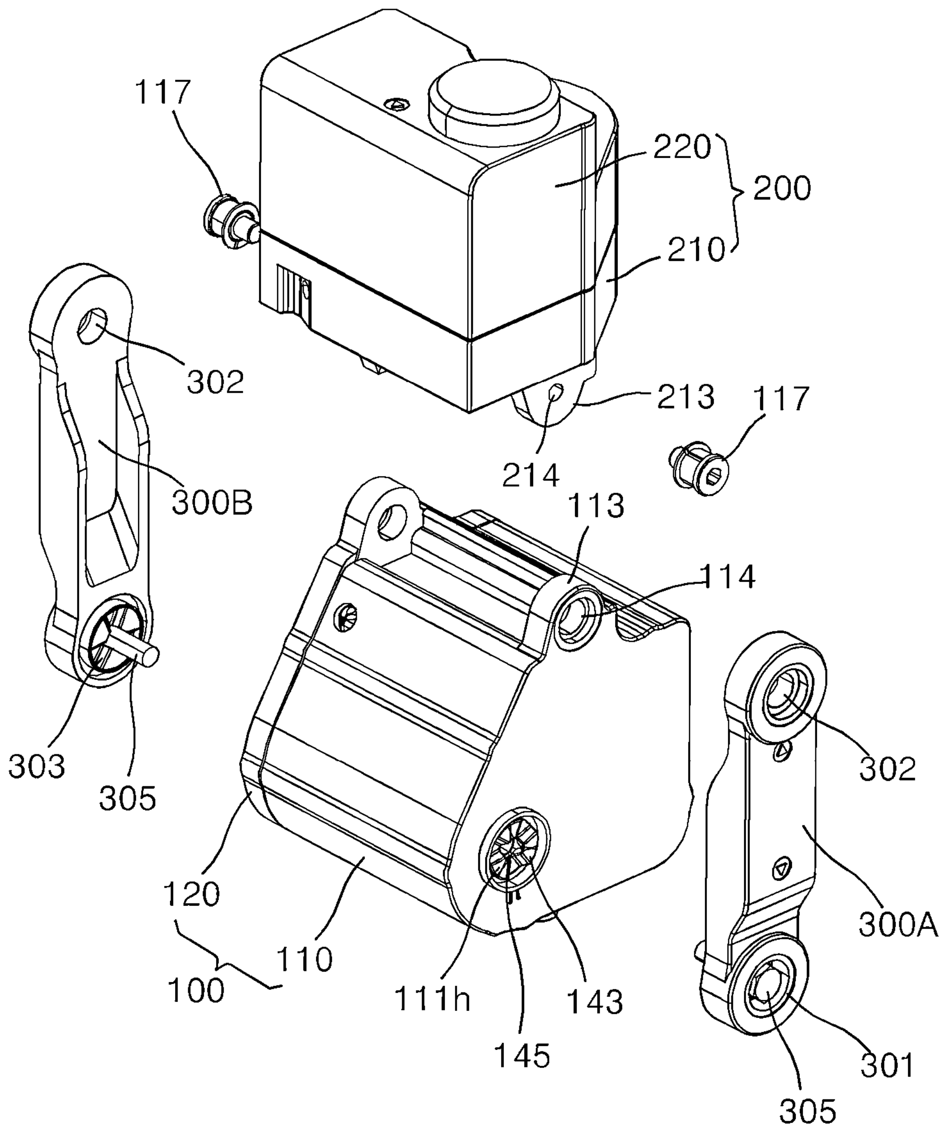

[FIG. 13A]
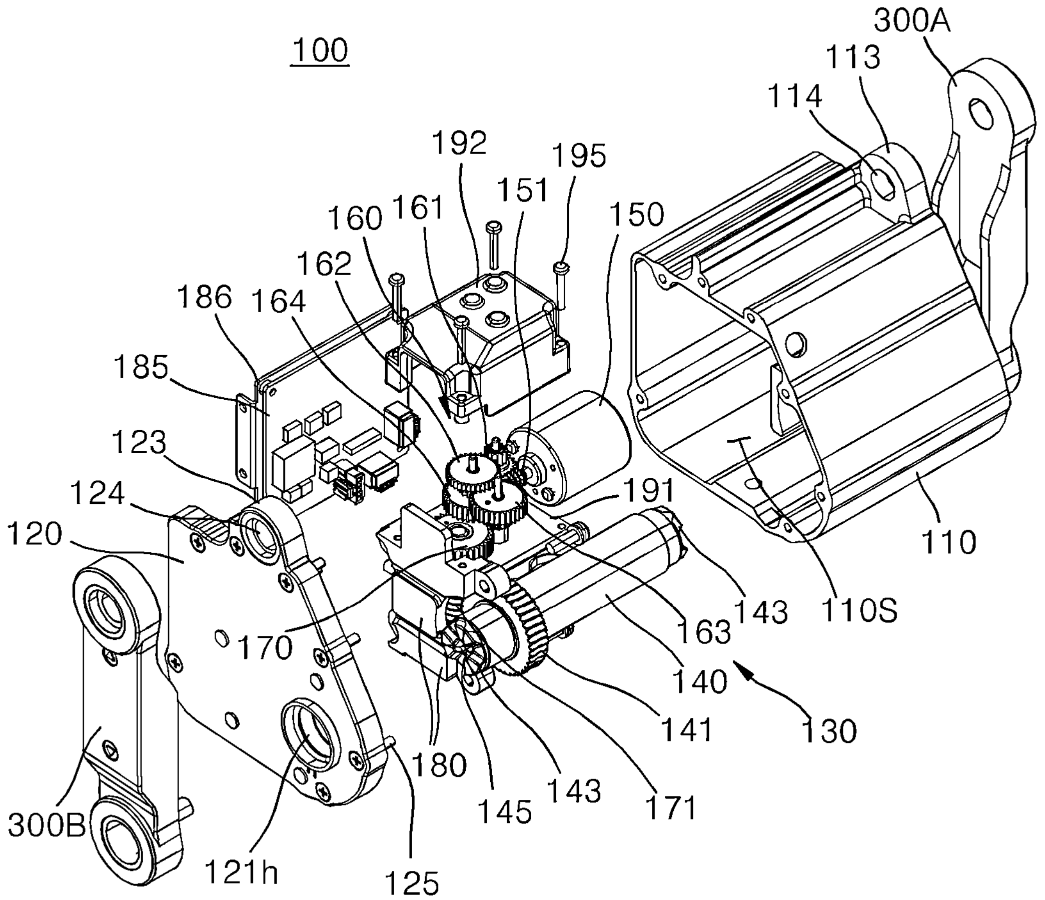

[FIG. 13B]
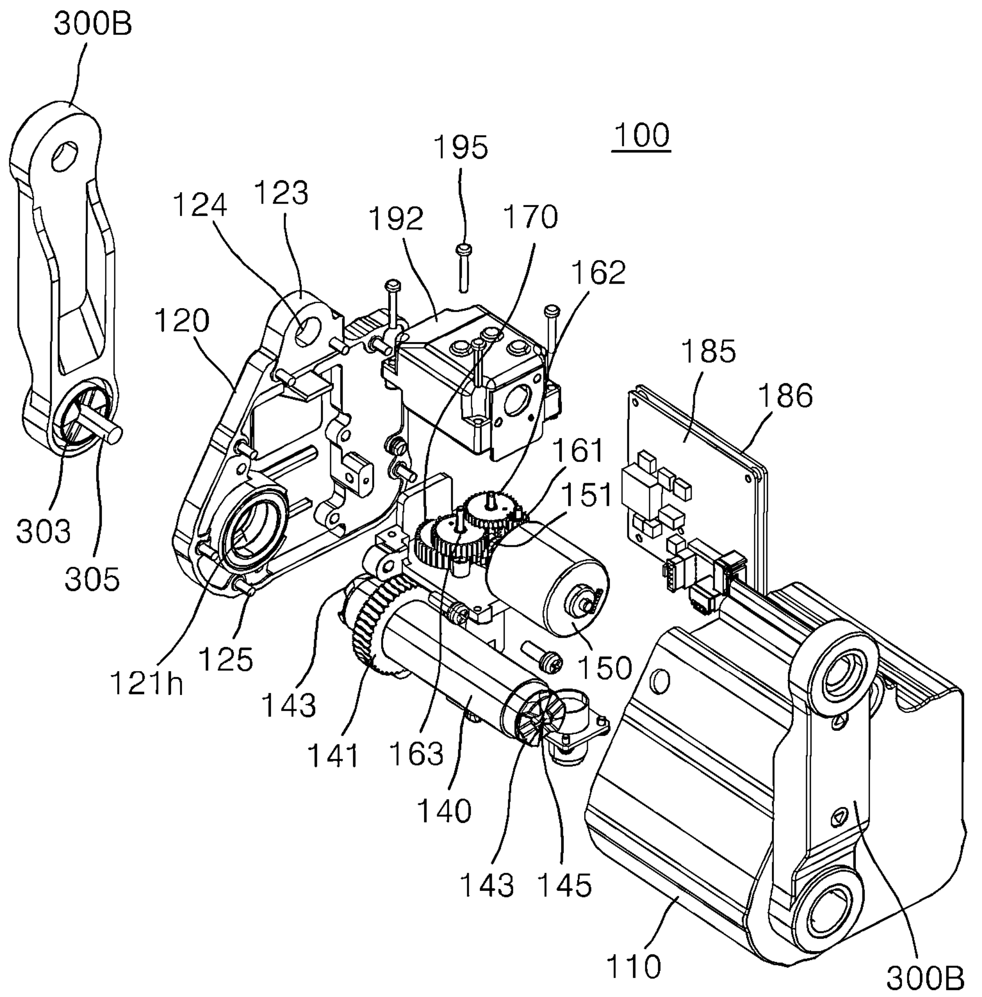

[FIG. 14]
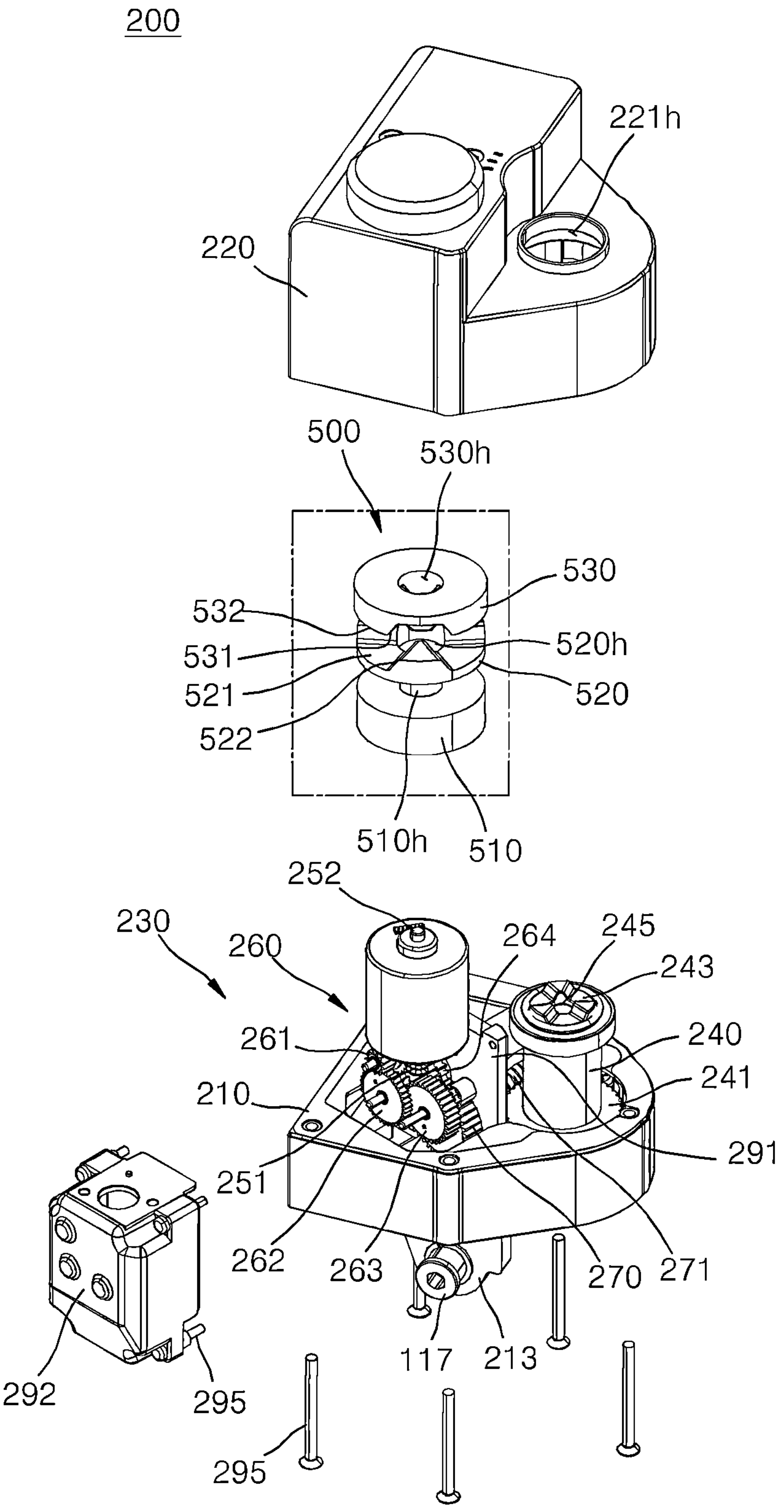

[FIG. 15]
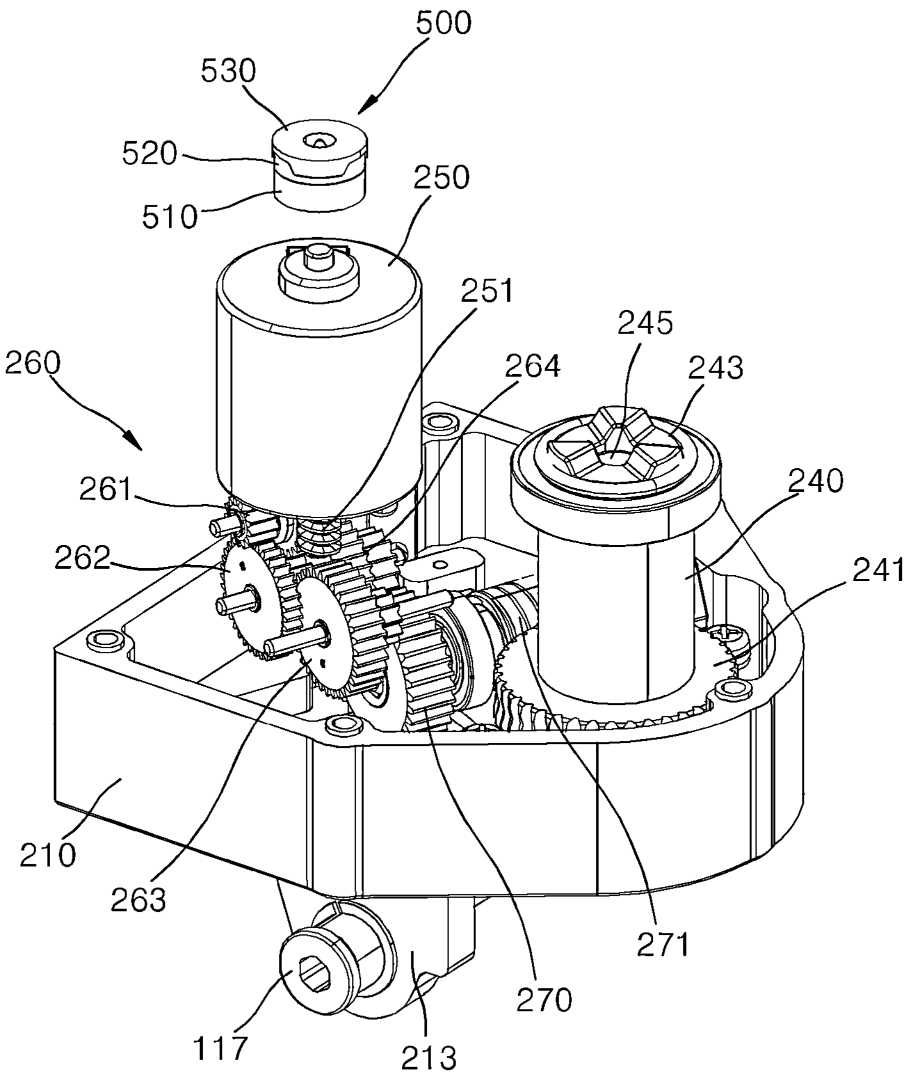

[FIG. 16]
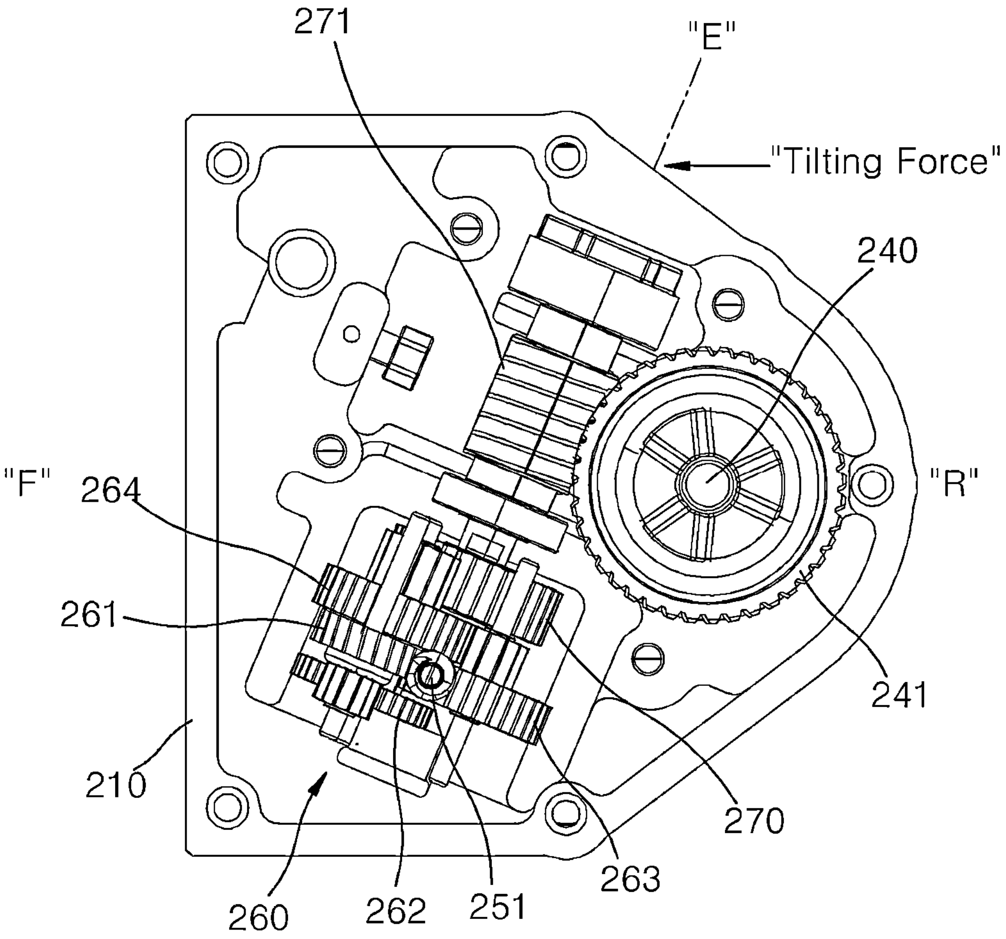

[FIG. 17]
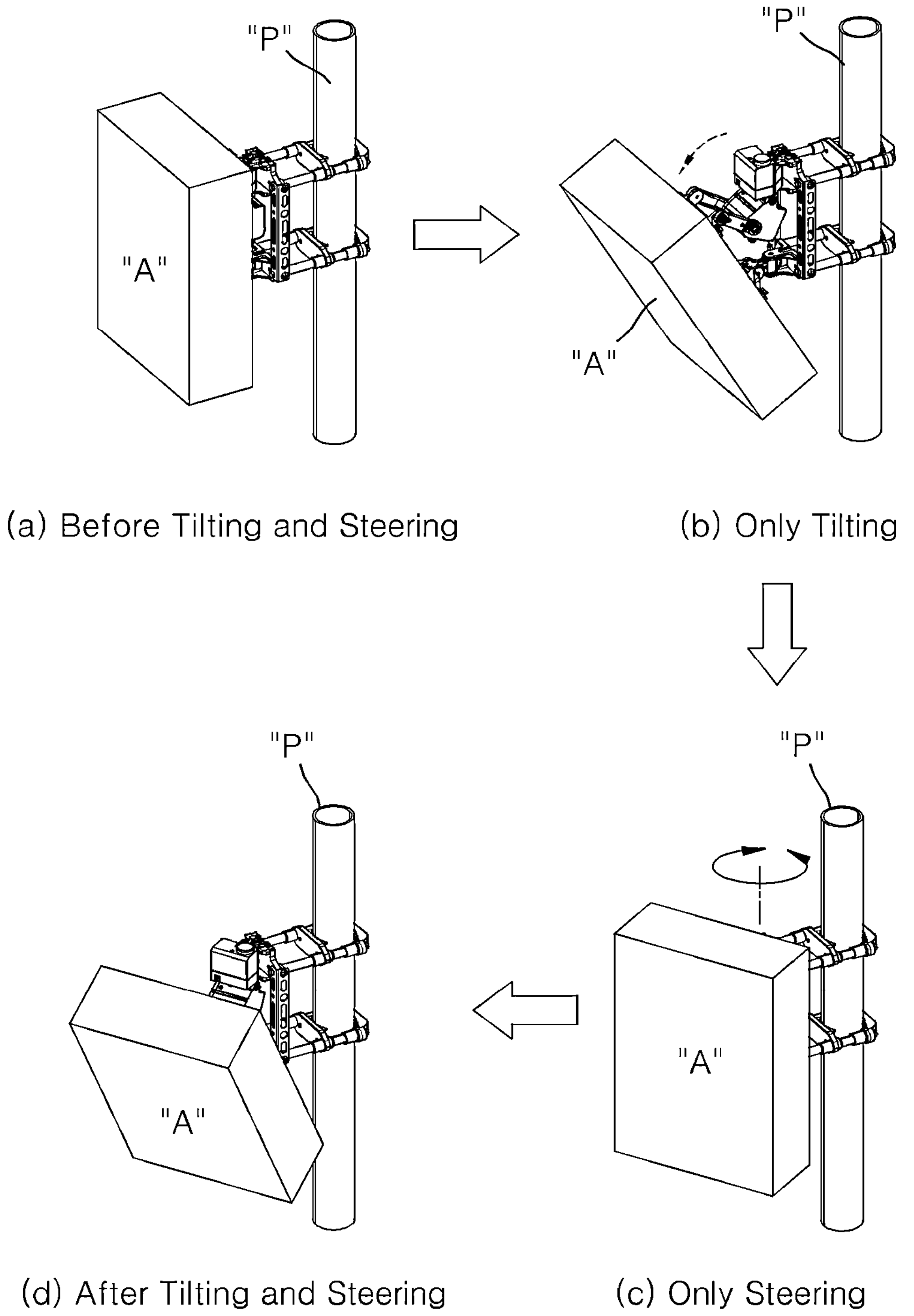

CLAMPING APPARATUS FOR ANTENNA

CROSS-REFERENCE TO RELATED APPLICATIONS

This application is a continuation application of International Application No. PCT/KR2023/006522, filed May 15, 2023, which claims the benefit of Korean Patent Application Nos. 10-2022-0068546, filed Jun. 3, 2022; and 10-2023-0061957, filed May 12, 2023, in the Korean Intellectual Property Office, the disclosures of which are incorporated herein in their entirety by reference.

TECHNICAL FIELD

The present invention relates to a clamping apparatus for an antenna, and more particularly, to a clamping apparatus for an antenna, which is capable of efficiently disposing an antenna device in a dense installation space, easily adjusting a direction of the antenna device, minimizing interference caused by a size of the antenna device when the direction is adjusted, and minimizing the occurrence of an abnormal sound such as backlash noise when a directionality of the antenna device is adjusted.

BACKGROUND ART

In general, wireless communication technologies, for example, a multiple-input/multiple-output (MIMO) technology refers to a technology for innovatively increasing data transmission capacity by using a plurality of antennas. This technology uses a spatial multiplexing technique, in which a transmitter transmits different data through the respective transmission antennas, and a receiver distinguishes the transmitted data by performing appropriate signal processing.

Therefore, it is possible to transmit a larger amount of data by increasing both the number of transmitting antennas and the number of receiving antennas and thus increasing channel capacities. For example, if the number of antennas increases to ten, the channel capacity of about 10 times is ensured by using the same frequency band in comparison with the current single antenna system.

Eight antennas are used in 4G LTE-advanced, and a product equipped with 64 or 128 antennas in a pre-5G step has been released on the market. Base station equipment having a much larger number of antennas has been developed in 5G, which refers to a massive MIMO technology. The cell management is 2-dimension in the past, whereas 3D-beam forming is currently enabled when the massive MIMO technology is introduced, which may also represent a full-dimension (FD) MIMO.

In the massive MIMO technology, the number of transmitters and the number of filters are increased as the number of antennas (ANTs) is increased. Nevertheless, because of cost of lease or spatial restriction in respect to an installation location, RF components (antennas, filters, power amplifiers, transceivers, etc.) need to be practically manufactured to be small in size, light in weight, and inexpensive, and the massive MIMO requires a high output to expand a coverage. However, electric power consumption and heat generation, which are caused by the high output, have a negative effect on reductions in weight and size.

In particular, to install the MIMO antenna, in which modules including RF elements and digital elements are coupled in a layered structure, in a limited space, there is a need for compact and miniaturized design of a plurality of layers constituting the MIMO antenna in order to maximize ease of installation or spatial utilization. Further, there is a strong need for free adjustment of directions of an antenna device installed on a single support pole. In order to meet the need, Korean Patent No. 10-2095871 (published on Apr. 2, 2020) (hereinafter, referred to as 'the related art') discloses a 'clamping apparatus for an antenna' including a tilting unit configured to rotate an antenna device in an upward/downward direction, and a steering unit configured to rotate the antenna device in a leftward/rightward direction.

However, in the related art, there is a problem in that a range in which the tilting unit rotates the antenna device in the upward/downward direction is small.

In addition, there is a problem in that backlash noise often occurs on gear connection parts, which are connected to enable the tilting rotation and the steering rotation, each time the directionality of the antenna device, which is somewhat heavy in weight, is adjusted by tilting or steering the antenna device.

DISCLOSURE

Technical Problem

The present invention has been made in an effort to solve the above-mentioned problem, and an object of the present invention is to provide a clamping apparatus for an antenna, which is capable of tilting-rotating an antenna device in an upward/downward direction, steering-rotating the antenna device in a leftward/rightward direction, and ensuring a maximum rotation range in each direction.

Further, another object of the present invention is to provide a clamping apparatus for an antenna that is selectively equipped with an extension bar assembly by a user to suit the number of antenna devices installed on a support pole and suit an installation space for the antenna device.

In addition, still another object of the present invention is to provide a clamping apparatus for an antenna, which is capable of suppressing the occurrence of mechanical backlash noise from each of connection parts implemented to enable a tilting rotation and a steering rotation of an antenna device during an antenna direction adjustment including the tilting rotation and the steering rotation of the antenna device that is a member comparatively heavy in weight.

Further, yet another object of the present invention is to provide a clamping apparatus for an antenna, which is capable of intensively installing an antenna device to form two steering rotation points based on an antenna installation bracket, thereby enabling the miniaturization design of products.

The technical objects of the present invention are not limited to the aforementioned technical object, and other technical objects, which are not mentioned above, may be clearly understood by those skilled in the art from the following descriptions.

Technical Solution

A clamping apparatus for an antenna according to an embodiment of the present invention includes: fixing bracket parts provided at upper and lower sides of a support pole to mediate installation of an antenna device on the support pole; an antenna installation bracket configured to mediate installation of the antenna device at a front side; a steering driving unit connected to the fixing bracket part and configured to operate to steer and rotate the antenna device; and a tilting driving unit having an upper end hingedly connected to the steering driving unit and a lower end hingedly connected to an upper end of a rear surface of the antenna installation bracket by means of a pair of tilting link members, the tilting driving unit being configured to tilt and rotate the antenna device, in which the clamping apparatus may further include a backlash reduction design shape for reducing the occurrence of mechanical backlash noise caused by an eccentric load of the antenna device.

In this case, the fixing bracket parts may include: an upper fixing bracket part provided on the support pole; and a lower fixing bracket part provided on the support pole and provided below the upper fixing bracket part.

In addition, the backlash reduction design shape may be provided as an inclined surface on a mounting rotation block that mediates hinge connection so as to be tilting rotatable and steering rotatable relative to the lower support bracket part installed on the support pole while corresponding to the lower fixing bracket part.

In addition, the backlash reduction design shape may have a trapezoidal cross-section including the inclined surface at least being in surface contact with a steering hinge bushing interposed between steering hinges inserted into steering hinge installation groove provided at a hinge connection point of the mounting rotation block.

In addition, the steering hinge installation groove may be processed in a groove shape with opened upper and lower sides so that an upper steering hinge and a lower steering hinge are interposed by means of an upper vertical shaft mounting part and a lower vertical shaft mounting part formed on the lower support bracket part.

In addition, the mounting rotation block may include: a rotation block body having a rear end hingedly connected to the lower support bracket part and a front end hingedly connected to a lower end of a rear surface of the antenna installation bracket; and a steering hinge cover to which a lateral surface of a rear end of the rotation block body is coupled, and the steering hinge installation groove may be formed so that an inner surface thereof has a circular cross-section when the steering hinge cover is coupled to the rotation block body.

In addition, the backlash reduction design shape may have a trapezoidal cross-section including the inclined surface at least being in surface contact with a tilting hinge bushing interposed between tilting hinges inserted into a tilting hinge installation groove provided at a hinge connection point of the mounting rotation block.

In addition, the tilting hinge installation groove may be processed in a groove shape opened toward one side surface and the other side surface so that one side tilting hinge and the other side tilting hinge are interposed through a lower horizontal bracket provided at a lower end of the antenna installation bracket.

In addition, the mounting rotation block may include: a rotation block body having a rear end hingedly connected to the lower support bracket part and a front end hingedly connected to a lower end of a rear surface of the antenna installation bracket; and a tilting hinge cover coupled to a lower surface of a front end of the rotation block body, and the tilting hinge installation groove may be formed so that an inner surface thereof has a circular cross-section when the tilting hinge cover is coupled to the rotation block body.

In addition, the backlash reduction design shape may include: one side matching part formed at each of two opposite ends of a tilting shaft of the tilting driving unit; and the other side matching part formed at an end of the tilting link member coupled to the tilting shaft, and the backlash reduction design shape may have a trapezoidal cross-section in which a tooth surface, which is caught in a rotation direction, includes an inclined surface.

In addition, the backlash reduction design shape may include: one side matching part formed at each of two opposite ends of a steering shaft of the steering driving unit; and the other side matching part formed on an upper support bracket part installed on the support pole while corresponding to the upper fixing bracket part so as to be coupled to the steering shaft, and the backlash reduction design shape may have a trapezoidal cross-section in which a tooth surface, which is caught in a rotation direction, includes an inclined surface.

In addition, the backlash reduction design shape may include: a tilting damper interposed between an inner surface of a tilting driving part housing of the tilting driving unit and a tilting drive motor; and an inclined surface configured to interfere, in a tilting rotation direction or a steering rotation direction, with a steering damper interposed between an inner surface of a steering upper housing of the steering driving unit and a steering drive motor.

In addition, the steering driving unit may include: a steering drive motor configured to operate electrically; a steering shaft disposed vertically upward and downward; and a transmission gear assembly configured to receive driving power from the steering drive motor and transmit the driving power to the steering shaft, and a transmission gear of the transmission gear assembly, which engages with the steering shaft, may be disposed to be inclined forward or rearward at a predetermined angle so as not to be orthogonal to a tilting rotation direction of a forward/rearward direction of the antenna device.

Advantageous Effects

The clamping apparatus for an antenna according to the embodiment of the present invention may achieve the following various effects.

First, the user may apply the clamping apparatus that is selectively equipped with the extension bar assembly to suit the number of the antenna devices installed on the support pole and suit the installation space for the antenna device, which may maximize installation convenience and spatial utilization related to the support pole.

Second, it is possible to suppress the occurrence of mechanical backlash noise from each of the connection parts implemented to enable the tilting rotation and the steering rotation of the antenna device during the antenna direction adjustment including the tilting rotation and the steering rotation of the antenna device that is a member comparatively heavy in weight.

Third, it is possible to intensively install the antenna device to form the two steering rotation points based on the antenna installation bracket, thereby enabling the miniaturization design of products.

DESCRIPTION OF DRAWINGS

FIGS. 1A and 1B are front and rear perspective views illustrating states in which an antenna device is installed on a support pole by using a clamping apparatus for an antenna according to an embodiment of the present invention.

FIGS. 2A and 2B are front and rear perspective views illustrating the clamping apparatus for an antenna according to the embodiment of the present invention.

FIGS. 3A and 3B are exploded perspective views of FIGS. 2A and 2B, i.e., exploded perspective views illustrating states in which the antenna installation bracket is coupled to a tilting driving unit and a steering driving unit among components in FIGS. 2A and 2B.

FIGS. 4A and 4B are detailed exploded perspective views of FIGS. 2A and 2B.

FIGS. 5A and 5B are a side view and a top plan view illustrating a state in which the antenna device is installed without using an extension bar assembly among the components in FIGS. 2A and 2B and a state in which the antenna device is installed by using the extension bar assembly.

FIG. 5C is a cross-sectional view taken along line B-B illustrated in (b) of FIG. 5A.

FIG. 6 is a partially cut-away perspective view illustrating a state in which a detachable clamping gear panel is installed to be clamped by an outer peripheral surface of the support pole among the components illustrated in FIG. 1.

FIG. 7 is an exploded perspective view illustrating a state in which among the components illustrated in FIGS. 4A and 4B, a lower end of the antenna installation bracket, a support pole side installation bracket part, and a mounting rotation block, which connects the lower end of the antenna installation bracket and the support pole side installation bracket part, are disassembled.

FIGS. 8A and 8B are front and rear exploded perspective views illustrating a state in which the mounting rotation block among the components in FIG. 7 is disassembled.

FIG. 9 is a partial vertical cross-sectional view illustrating connection parts and for explaining a function of a backlash blocking bushing among the components in FIGS. 8A and 8B.

FIGS. 10A and 10B are left and right exploded perspective views illustrating the tilting driving unit and the steering driving unit among the components of the clamping apparatus for an antenna according to the embodiment of the present invention.

FIGS. 11A and 11B are exploded perspective views illustrating one side and the other side and illustrating a connection relationship between the tilting driving unit, the steering driving unit, and a tilting link member among the components of the clamping apparatus for an antenna according to the embodiment of the present invention.

FIG. 12 is a detailed exploded perspective view of FIG. 11A.

FIGS. 13A and 13B are exploded perspective views illustrating one side and the other side and illustrating the tilting driving unit among the components of the clamping apparatus for an antenna according to the embodiment of the present invention.

FIG. 14 is an exploded perspective view of the steering driving unit among the components of the clamping apparatus for an antenna according to the embodiment of the present invention.

FIG. 15 is a perspective view illustrating a transmission gear assembly in a state in which a gear housing is removed among the components in FIG. 14.

FIG. 16 is a top plan view illustrating a state in which an upper housing of the steering unit is removed among the components in FIG. 14.

FIG. 17 is a perspective view illustrating a state in which a direction is set in accordance with a tilting rotation and/or a steering rotation of the antenna device by using the clamping apparatus for an antenna according to the embodiment of the present invention.

EXPLANATION OF REFERENCE NUMERALS AND SYMBOLS

| | | | |
|---|---|---|---|
| P: | Support pole | A: | Antenna device |
| 1: | Clamping apparatus for antenna | 50A: | Upper fixing bracket part |
| 50B: | Lower fixing bracket part | 60: | Extension bar assembly |
| 61A, 61B: | Front and rear horizontal bars | 63: | Left and right horizontal bars |
| 65: | Bolt fastening hole | 67: | Clamping gear panel |
| 69: | Gear panel fixing screw | 70: | Vertical support frame |
| 80A: | Upper support bracket part | 80B: | Lower support bracket part |
| 81A: | Upper vertical shaft mounting part | 81B: | Lower vertical shaft mounting part |
| 82: | Steering hinge connection bolt | 83: | The other side matching part |
| 90: | Antenna installation bracket | 91: | Base bracket panel |
| 92: | Diagonal line mounting part | 93: | Additional bolt fastening hole |
| 94: | Mounting enlarged portion | 95: | Plurality of bolt through-holes |
| 96: | Antenna installing/fastening hole | 97: | Antenna fixing screw |
| 98U: | Upper horizontal bracket | 98D: | Lower horizontal bracket |
| 99U: | Upper hinge connection end | 99D: | Lower hinge connection end |
| 100: | Tilting driving unit | 110: | Tilting driving part housing |
| 120: | Tilting driving part housing cover | 130: | Tilting driving part |
| 140: | Tilting shaft | 143: | One side matching part |
| 145: | Bolt fastening hole | 150: | Tilting drive motor |
| 160: | Transmission gear assembly | 180: | Unit installation frame |
| 200: | Steering driving unit | 210: | Steering lower housing |
| 220: | Steering upper housing | 230: | Steering driving part |
| 240: | Steering shaft | 243: | One side matching part |
| 245: | Bolt fastening hole | 250: | Steering drive motor |
| 260: | Transmission gear assembly | 300A, 300B: | Tilting link member |
| 303: | The other side matching part | 305: | Link assembling bolt |
| 400: | Mounting rotation block | 410: | Rotation block body |
| 420: | Steering hinge cover | 425A, 425B: | Steering hinge installation groove |
| 435A, 435B: | Tilting hinge installation groove | 440L-1: | One side tilting hinge |
| 440R-1: | The other side tilting hinge | 440L-2: | One side tilting hinge bushing |
| 440R-2: | The other side tilting hinge bushing | 450U-1: | Upper steering hinge |
| 450D-1: | Lower steering hinge | 450U-2: | Upper steering hinge bushing |
| 450D-2: | Lower steering hinge bushing | 500: | Steering damper |
| 510: | Installation gasket | 520: | Lower damper |
| 530: | Upper damper | | |

BEST MODE

Hereinafter, a clamping apparatus for an antenna according to an embodiment of the present invention will be described in detail with reference to the accompanying drawings.

In giving reference numerals to constituent elements of the respective drawings, it should be noted that the same constituent elements will be designated by the same reference numerals, if possible, even though the constituent elements are illustrated in different drawings. Further, in the following description of the embodiments of the present invention, a detailed description of related publicly-known configurations or functions will be omitted when it is determined that the detailed description obscures the understanding of the embodiments of the present invention.

In addition, the terms first, second, A, B, (a), and (b) may be used to describe constituent elements of the embodiments of the present invention. These terms are used only for the purpose of discriminating one constituent element from another constituent element, and the nature, the sequences, or the orders of the constituent elements are not limited by the terms. Further, unless otherwise defined, all terms used herein, including technical or scientific terms, have the same meaning as commonly understood by those skilled in the art to which the present invention pertains. The terms such as those defined in commonly used dictionaries should be interpreted as having meanings consistent with meanings in the context of related technologies and should not be interpreted as ideal or excessively formal meanings unless explicitly defined in the present application.

FIGS. 1A and 1B are front and rear perspective views illustrating states in which an antenna device is installed on a support pole by using a clamping apparatus for an antenna according to an embodiment of the present invention, FIGS. 2A and 2B are front and rear perspective views illustrating the clamping apparatus for an antenna according to the embodiment of the present invention, FIGS. 3A and 3B are exploded perspective views of FIGS. 2A and 2B, i.e., exploded perspective views illustrating states in which antenna installation bracket is coupled to a tilting driving unit and a steering driving unit among components in FIGS. 2A and 2B, FIGS. 4A and 4B are detailed exploded perspective views of FIGS. 2A and 2B, FIGS. 5A and 5B are a side view and a top plan view illustrating a state in which the antenna device is installed without using an extension bar assembly among the components in FIGS. 2A and 2B and a state in which the antenna device is installed by using the extension bar assembly, FIG. 5C is a cross-sectional view taken along line B-B illustrated in (b) of FIG. 5A, and FIG. 6 is a partially cut-away perspective view illustrating a state in which a detachable clamping gear panel is installed to be clamped by an outer peripheral surface of the support pole among the components illustrated in FIG. 1.

With reference to FIGS. 1A to 6, a clamping apparatus 1 for an antenna according to an embodiment of the present invention simultaneously serves to mediate installation of an antenna device A on a support pole P and enable setting of detailed directionality with respect to the support pole P in a fixed state in order to satisfy a beam forming design of a frequency beam emitted through the antenna device A.

More specifically, with reference to FIGS. 1A and 1B, the clamping apparatus 1 for an antenna according to the embodiment of the present invention may be coupled to be spaced apart from the support pole P, which is provided vertically, at a predetermined distance in a horizontal direction so that the clamping apparatus 1 is installed in the form of a cantilevered beam in the longitudinal direction of the support pole P by means of support pole installation bracket parts 50A, 50B, 80A, and 80B provided around an outer peripheral surface of the support pole P.

In this case, the support pole installation bracket parts 50A, 50B, 80A, and 80B may include the fixing bracket parts 50A and 50B provided at upper and lower sides of the support pole P to mediate installation of the antenna device A on the support pole P, and the support bracket parts 80A and 80B fixedly installed on the support pole P while corresponding to the fixing bracket part 50A. Specific configurations and functions of the fixing bracket parts 50A and 50B and the support bracket parts 80A and 80B will be described below more specifically.

For convenience of understanding, an example is described in which the antenna device A is installed on and applied to the clamping apparatus 1 implemented by the embodiment of the present invention. However, it should be understood that the present invention includes all the cases in which lighting devices (not illustrated), such as LED lighting devices and high-output sport lighting devices, are installed on the support pole P in addition to the antenna device A.

For example, the clamping apparatus 1 implemented by the embodiment of the present invention is used to mediate installation of lighting devices to be installed in a sports stadium or the like, such that the user may manipulate a tilting rotation and/or a steering rotation in a desired direction.

With reference to FIGS. 1A and 1B, the clamping apparatus 1 for an antenna according to the embodiment of the present invention may be installed by means of an extension bar assembly 60 configured to adjust an installation distance of the antenna device A so that the antenna device A is spaced apart from the support pole P at a predetermined distance.

With reference to FIGS. 5A to 5C, the extension bar assembly 60 may be selectively provided in accordance with whether the antenna device A is installed to be spaced apart from the support pole P. In case that the antenna device A is coupled and relatively tightly attached to the outer peripheral surface of the support pole P without the extension bar assembly 60, only the constituent element corresponding to the extension bar assembly 60 may be detached and removed. In case that the extension bar assembly 60 is removed, clamping gear panels 67 provided on left and right horizontal bars 63 to be described below may be installed directly on an upper support bracket part 80A and a lower support bracket part 80B and then directly clamp the outer peripheral surface of the support pole P. At the same time, support pole fixing bolts 52, which will be described below and fastened to an upper the fixing bracket part 50A and a lower fixing bracket part 50B, may be fastened directly to the upper support bracket part 80A and the lower support bracket part 80B.

FIGS. 1A and 1B illustrate the embodiment in which the extension bar assembly 60 is provided, and FIG. 5A and (a) of FIG. 5B illustrate the embodiment in which the extension bar assembly 60 is excluded.

In this case, the extension bar assembly 60 may include an upper extension bar assembly (no reference numeral) provided at a height corresponding to the upper the fixing bracket part 50A, and a lower extension bar assembly (no reference numeral) provided at a height corresponding to the lower fixing bracket part 50B. The upper extension bar assembly and the lower extension bar assembly are identical in configuration to each other but different in position from each other. The description of any one of the upper extension bar assembly and the lower extension bar assembly may be replaced with the description of the other of the upper extension bar assembly and the lower extension bar assembly without providing separate reference numerals.

Meanwhile, the extension bar assembly 60 may include a pair of front and rear horizontal bars 61A and 61B horizontally extending toward two opposite left and right ends of the upper fixing bracket part 50A and the lower fixing bracket part 50B, and the left and right horizontal bars 63 configured to dispose and connect rear ends of the pair of front and rear horizontal bars 61A and 61B in a leftward/rightward horizontal direction.

The above-mentioned extension bar assembly 60 is not denoted by a separate reference numeral. However, a pair of upper and lower assemblies 60A and 60B may be provided in shapes surrounding the other side of the outer peripheral surface of the support pole P while corresponding to the upper and lower fixing bracket parts 50A and 50B provided in shapes surrounding one side of the outer peripheral surface of the support pole P.

Further, with reference to FIGS. 2A and 2B, the pair of front and rear horizontal bars 61A and 61B of the extension bar assembly 60 may extend by predetermined lengths toward the upper fixing bracket part 50A and the lower fixing bracket part 50B installed on the support pole P while penetrating the left and right horizontal bars 63, and the extension bar assembly 60 may be completely coupled to the support pole P by fastening the support pole fixing bolts 52 (see FIG. 5C), which are penetratively inserted from the upper fixing bracket part 50A and the lower fixing bracket part 50B, to bolt fastening holes 65 at the rear ends of the pair of front and rear horizontal bars 61A and 61B. With reference to FIG. 5C, front ends of the pair of front and rear horizontal bars 61A and 61B may be fixed to the left and right horizontal bars 63 by support bracket fastening bolts 62 that simultaneously penetrate the upper and lower support bracket parts 80A and 80B to be described below.

In this case, with reference to FIGS. 2A and 2B, gear panel installation grooves 85 (see FIG. 6) having slot shapes may be provided in inner surfaces of the left and right horizontal bars 63 directed toward the support pole P. The clamping gear panel 67 may be fixed to the gear panel installation groove 85 and have a plurality of gear teeth arranged in a ‘V’ shape to clamp the outer peripheral surface of the support pole P and prevent a slip.

In this case, the clamping gear panel 67 does not necessarily need to be formed in a ‘V’ shape and may be formed in a shape consistent with the outer peripheral surface of the support pole P, if possible. In case that the clamping gear panel 67 has a ‘V’ shape, the clamping gear panel 67 may be applied to the support poles P having various outer diameters.

The clamping gear panels 67 do not need to be provided only on the left and right horizontal bars 63. In case that the clamping apparatus is installed directly on the support pole P without the extension bar assembly 60, the clamping gear panels 67 may be installed on the inner surfaces of the upper and lower support bracket parts 80A and 80B to be described below, as illustrated in FIG. 6.

In this case, as illustrated in FIG. 6, the clamping gear panels 67 are provided such that after the clamping gear panels 67 are inserted into the gear panel installation grooves 85, outer end surfaces of middle portions having no gear tooth are matched with outer surfaces of the upper and lower support bracket parts 80A and 80B. The clamping gear panels 67 may be fixed by gear panel fixing screws 69 fastened to screw fixing holes 87 formed adjacent to the upper and lower sides thereof. In this case, a stepped surface of a head portion 69B of the gear panel fixing screw 69, which has a larger diameter than a body portion 69A, overlaps the outer end surface of the clamping gear panel 67 having no gear tooth while the body portion 69A is inserted and fastened into the screw fixing hole 87, which may prevent the clamping gear panel 67 from separating from the gear panel installation groove 85.

Meanwhile, as illustrated in FIGS. 3A and 3B, the upper support bracket part 80A and the lower support bracket part 80B may be provided at the front ends of the pair of front and rear horizontal bars 61A and 61B of the extension bar assembly 60.

The method of coupling the front ends of the pair of front and rear horizontal bars 61A and 61B to the upper support bracket part 80A and the lower support bracket part 80B is identical to the method of coupling the rear ends of the pair of front and rear horizontal bars 61A and 61B to the upper fixing bracket part 50A and the lower fixing bracket part 50B, except for the use of the support pole fixing bolts 52 or the support bracket fastening bolts 62. Therefore, a specific description will be omitted.

The two opposite left and right ends of each of the upper support bracket part 80A and the lower support bracket part 80B may be securely connected by means of a pair of vertical support frames 70 disposed in an upward/downward vertical direction, as illustrated in FIGS. 3A and 3B.

The vertical support frames 70 may simultaneously connect and fix the front ends of the pair of front and rear horizontal bars 61A and 61B in the upward/downward direction among the components of the upper assembly 60A and the lower assembly 60B of the extension bar assembly 60.

In this case, the vertical support frame 70 may have a horizontal cross-section having a ‘L’ shape in order to simultaneously support approximately lateral end surfaces and rear end surfaces of the upper support bracket part 80A and the lower support bracket part 80B. The front ends of the pair of front and rear horizontal bars 61A and 61B may be penetratively supported on the portions that support the rear end surfaces of the upper support bracket part 80A and the lower support bracket part 80B.

As described above, the upper support bracket part 80A and the lower support bracket part 80B are provided at independent positions spaced apart from each other in the upward/downward direction in the longitudinal direction of the support pole P. However, the frame structure having a rectangular parallelepiped shape made by additionally installing the pair of vertical support frames 70 may securely and stably maintain the coupled state so that a clearance does not occur in the leftward/rightward direction and the forward/rearward direction.

Therefore, operations of a tilting driving unit 100 and a steering driving unit 200, which will be described below, may prevent the occurrence of mechanical backlash noise caused by physical assembling tolerance when the antenna device A, which is a weight member, performs a tilting rotation in the forward/rearward direction and a steering rotation in the leftward/rightward direction.

With reference to FIGS. 3A and 3B, the upper support bracket part 80A and the lower support bracket part 80B may have an upper vertical shaft mounting part 81A and a lower vertical shaft mounting part 81B protruding forward to provide two steering rotation points S1 and S2 required for the steering rotation of the antenna device A.

The pair of upper vertical shaft mounting parts 81A may protrude upward and downward, and an intermediate portion may be provided in the form of an empty space. Among the components of a steering driving unit 200 to be described below, a steering shaft 240 may be interposed in and connected to the empty space between the pair of upper vertical shaft mounting parts 81A.

The pair of lower vertical shaft mounting parts 81B may also protrude upward and downward, and an intermediate portion may be provided in the form of an empty space. A rear end of a mounting rotation block 400 to be described below may be interposed in and connected to the empty space between the pair of lower vertical shaft mounting parts 81B.

More specifically, with reference to FIGS. 4A and 4B, the upper vertical shaft mounting part 81A and the lower vertical shaft mounting part 81B may provide the two steering rotation points S1 and S2 so that a center of the steering shaft 240 of the steering driving unit 200 and a hinge connection point of the mounting rotation block 400 are positioned on the same vertical line in the upward/downward direction.

Meanwhile, with reference to FIGS. 4A and 4B, a tilting driving unit 100 may be hingedly connected to a lower portion of the steering driving unit 200 by means of a unit connection hinge 117 (see FIGS. 11A to 12 to be described below).

The configuration in which the steering driving unit 200 and the tilting driving unit 100 are hingedly connected means a configuration in which an upper end of an antenna installation bracket 90, which is provided at the front side to mediate the installation of the antenna device A, tilts relative to the steering driving unit 200 in a relatively fixed state while tilting and rotating, and the tilting driving unit 100 also tilts and rotates relatively within a predetermined angle range.

Further, with reference to FIGS. 4A and 4B, the tilting driving unit 100 may be connected to have at least three tilting rotation points T1, T2, and T3 with respect to the steering driving unit 200 and an antenna installation bracket 90.

A tilting rotation point (hereinafter, referred to as a 'rotation point T1') indicated by 'T1' refers to an axial direction of a tilting shaft 140 among the components of the tilting driving unit 100, i.e., a rotation center point of tilting link members 300A and 300B to be described below and connected thereto.

Further, a tilting rotation point (hereinafter, referred to as a 'rotation point T2') indicated by 'T2' may include a rotation route defined by the other end of the tilting link members 300A and 300B each having one end connected to the rotation point T1 and may be a rotation radius defined by an upper end of the antenna installation bracket 90 connected thereto. In this case, a rotation radius of the upper end of the antenna installation bracket 90 may refer to a tilting route of the antenna device A.

Meanwhile, a tilting rotation point (hereinafter, referred to as a 'rotation point T3') indicated by 'T3' may be a hinge connection point by the unit connection hinge 117 between the tilting driving unit 100 and the steering driving unit 200. The unit connection hinge 117 may be configured to enable the tilting driving unit 100 to freely rotatable relative to the steering driving unit 200.

In this case, as described above, on the premise that the steering driving unit 200 is a constituent element relatively fixed to the upper vertical shaft mounting part 81A, the steering driving unit 200 may be a constituent element in which the tilting driving unit 100 is relatively rotated below the steering driving unit 200.

When the upper ends of the tilting link members 300A and 300B tilt forward, the tilting driving unit 100 may rotate rearward at a predetermined angle based on the rotation point T3 by a load of the antenna device A that is a weight member connected thereto. That is, when the upper end of the antenna device A is tilted and rotated forward by the tilting link members 300A and 300B, a center of gravity of the antenna device A is moved rearward. The tilting driving unit 100 rotates about the rotation point T3 relative to the steering driving unit 200 to compensate for the movement of the center of gravity.

In this case, the tilting driving unit 100 and the steering driving unit 200 do not necessarily need to be connected by the rotation point T3 that is a single rotation point.

For example, although not illustrated, one link member type constituent element having the same shape as the tilting link members 300A and 300B may be further added and hingedly connected so that a tilting rotation point is added to each end. However, in case that the tilting driving unit 100 and the steering driving unit 200 are connected by the link member type, all the constituent elements such as hinges need to be provided in pairs, which may cause a problem in that the number of components increases.

In the case of the clamping apparatus 1 for an antenna according to the embodiment of the present invention, the tilting driving unit 100 and the steering driving unit 200 are hingedly connected to each other only by using the pair of unit connection hinges 117 without adding the link member type constituent element, such that it is possible to enable an overall miniaturization design of products and reduce the number of components.

Meanwhile, with reference to FIGS. 4A and 4B, on the premise that the tilting link members 300A and 300B are not tilted, the rotation point T3 may be positioned at least rearward of the rotation point T1 and the rotation point T2 when the rotation point T1 and the rotation point T2 are positioned on a straight line that is vertical upward and downward. More particularly, the rotation point T3 may be designed to be positioned at least forward of the two steering rotation points S1 and S2 positioned on the straight line that is vertical upward and downward. Hereinafter, among the steering rotation points, a rotation point indicated by S1 is referred to as a 'rotation point S1', and a rotation point indicated by S2 is referred to as a 'rotation point S2'.

Therefore, on the premise that the tilting link members 300A and 300B are stopped at positions before tilting, the rotation point T3 may be positioned rearward of an imaginary straight line, which connects the rotation point T1 and the rotation point T2, and the rotation point T3 may be positioned forward of the two steering rotation points S1 and S2.

In this case, because the antenna device A is a predetermined weight member, mechanical backlash noise occurs from a mechanical connection configuration of a connection point (the rotation point T1) of the tilting link members 300A and 300B when the directionality is adjusted to tilt and rotate the antenna device A. The occurrence of mechanical backlash noise further increases in case that the rotation point T3 is adjacent to the imaginary straight line that connects the rotation point T1 and the rotation point T2. Meanwhile, on the premise that the upper vertical shaft mounting part 81A and the lower vertical shaft mounting part 81B have the same protruding length, the steering rotation angle may be restricted within a predetermined range by a peripheral constituent element in case that the rotation point T3 is consistent with or positioned rearward of the imaginary straight line that connects the two steering rotation points S1 and S2.

Therefore, more particularly, on the premise that the tilting link members 300A and 300B are stopped at the positions before tilting, the rotation point T3 may be positioned rearward of the imaginary straight line, which connects the rotation point T1 and the rotation point T2, and be set to a position having a maximum spacing distance from the imaginary straight line that connects the two steering rotation points S1 and S2. In this case, the rotation point T3 may be set to a position at which mechanical backlash noise does not occur. Hereinafter, the cause of mechanical backlash noise and the principle for preventing the mechanical backlash noise will be described more specifically.

Meanwhile, with reference to FIGS. 1A to 4B, the antenna device A may be coupled by the antenna installation bracket 90 so that the upper end of the antenna device A is tilted and rotated in the forward/rearward direction about an antenna tilting rotation point T4 (hereinafter, referred to as a 'rotation point T4') of a lower end of the antenna device A by receiving tilting rotation and/or steering rotation driving power of the tilting driving unit 100 and the steering driving unit 200, or two opposite left and right ends of the antenna device A are steered and rotated in the forward/rearward direction about the two steering rotation points S1 and S2.

More specifically, the upper end of the antenna installation bracket 90 may be connected, on at least one point, to the upper support bracket part 80A by means of the pair of tilting link members 300A and 300B, the tilting driving unit 100, and the steering driving unit 200 so as to be steered and rotated, and the lower end of the antenna installation bracket 90 may be connected, on at least one point, to the lower support bracket part 80B so as to be steered and rotated.

As illustrated in FIGS. 3A and 3B, the antenna installation bracket 90 may include two mounting enlarged portions 94 extending outward from a base bracket panel 91 formed in a rectangular panel shape.

A plurality of bolt through-holes 95 is formed in the base bracket panel 91 and the mounting enlarged portions 94 to diversify the positions at which the plurality of bolt through-holes 95 is formed, such that the base bracket panel 91 may be fastened to an appropriate position in accordance with the size and shape of the antenna device A to be coupled. Antenna fastening bolts 94 (see FIG. 4A) penetrate the plurality of bolt through-holes 95 and are fastened to non-illustrated bolt fastening holes formed in a rear surface of the antenna device A, such that the antenna device A may be securely mounted on the antenna installation bracket 90.

Further, the clamping apparatus may further include four diagonal line mounting parts 92 integrally extending diagonally outward from edge portions of the base bracket panel 91 of the antenna installation bracket 90, and additional bolt fastening holes 93 may be formed in the diagonal line mounting parts 92.

Meanwhile, antenna installing/fastening holes 96 are formed at a plurality of points on the antenna installation bracket 90 and formed through the antenna installation bracket 90 in the forward/rearward direction, and the rear surface of the antenna device A may be securely coupled by means of a plurality of antenna fixing screws 97 penetratively fastened to the antenna installing/fastening holes 96.

An upper horizontal bracket 98U may be fixed to rear surface portions of the two upper diagonal line mounting parts 92 among the four diagonal line mounting parts 92, and a lower horizontal bracket 98D may be fixed to rear surface portions of the two lower diagonal line mounting parts 92 among the four diagonal line mounting parts 92. In particular, the lower horizontal bracket 98D may be coupled, by bolting, to the additional bolt fastening holes 93, which are formed in the antenna installation bracket 90, by means of additional mounting bolts 98S that penetrate the lower horizontal bracket 98D forward and rearward.

The upper horizontal bracket 98U serves to mediate the hinge connection of the pair of tilting link members 300A and 300B to the base bracket panel 91 with respect to the rotation point T2 formed at the upper end thereof. In particular, hinge interposition holes 301 and 302 for hinge coupling may be respectively provided at the ends of the pair of tilting link members 300A and 300B that correspond to the rotation point T1 and the rotation point T2.

In addition, the lower horizontal bracket 98D serves to mediate the hinge connection to the base bracket panel 91 with respect to the rotation point T4 formed on the mounting rotation block 400.

The upper horizontal bracket 98U and the lower horizontal bracket 98D may be elongated in the leftward/rightward horizontal direction.

A pair of upper hinge connection ends 99U may extend rearward from the upper horizontal bracket 98U and be hingedly connected to the tilting link members 300A and 300B by means of link connection hinges 311 and 312 through the hinge interposition hole 302 corresponding to the rotation point T2 of the tilting link members 300A and 300B.

A pair of lower hinge connection ends 98D-1 may extend rearward from the lower horizontal bracket 98D and be hingedly connected to a front end of the mounting rotation block 400 with respect to the rotation point T4 by means of a pair of block tilting hinges 440L and 440R to be described below.

The configuration in which the mounting rotation block 400 is hingedly coupled to a lower hinge connection end 99D of the lower horizontal bracket 98D will be described more specifically in the following description that explains the principle of blocking mechanical backlash noise.

A state in which the antenna device is installed on the support pole P by using the clamping apparatus 1 for an antenna according to the embodiment of the present invention configured as described above and advantages thereof will be briefly described below.

That is, with reference to FIGS. 5A to 5C, in the clamping apparatus 1 for an antenna according to the present invention, the extension bar assembly 60 may be selectively mounted and tightly coupled to the support pole P depending on the surrounding circumstances of the support pole P, or the installation position of the antenna device A may be changed so that the antenna device A is spaced apart from the support pole P at a predetermined distance.

For example, with reference to FIGS. 5A and 5B, in case that the extension bar assembly 60 is not provided (see (a) in the drawings), the antenna device A is relatively tightly coupled to the support pole P, such that the antenna device A may be intensively installed to minimize interference when the directionality of the antenna device A is adjusted in case that surrounding interference components (the other antenna devices and the like) are not present. In case that the extension bar assembly 60 is provided (see (b) in the drawings), the antenna device A may be dispersively installed so as to be further spaced apart from the support pole P at a predetermined distance (see reference numeral "D") so that the antenna device A does not interfere with the surrounding interference components (the other antenna device and the like).

With reference to FIG. 5C, the pair of front and rear horizontal bars 61A and 61B of the extension bar assembly 60 may extend by a predetermined length to the upper fixing bracket part 50A and the lower fixing bracket part 50B while penetrating the left and right horizontal bars 63, and the extension bar assembly 60 may be coupled to the support pole P by fastening the support pole fixing bolts 52, which are penetratively inserted into the upper fixing bracket part 50A and the lower fixing bracket part 50B, to the bolt fastening holes 65 in leading end portions of the pair of front and rear horizontal bars 61A and 61B.

FIG. 7 is an exploded perspective view illustrating a state in which among the components illustrated in FIGS. 4A and 4B, a lower end of the antenna installation bracket, a support pole side installation bracket part, and a mounting rotation block, which connects the lower end of the antenna installation bracket and the support pole side installation bracket part, are disassembled, FIGS. 8A and 8B are front and rear exploded perspective views illustrating a state in which the mounting rotation block among the components in FIG. 7 is disassembled, and FIG. 9 is a partial vertical cross-sectional view illustrating connection parts and for explaining a function of a backlash blocking bushing among the components in FIGS. 8A and 8B.

The clamping apparatus 1 for an antenna according to the embodiment of the present invention may further include a backlash reduction design shape for blocking mechanical backlash noise that may be caused by an eccentric load in a gravitational direction of the antenna device A when the directionality is adjusted by tilting-rotating and/or steering-rotating the antenna device A provided as a comparatively heavy weight member.

In particular, the clamping apparatus 1 for an antenna according to the embodiment of the present invention is dispersively applied to a plurality of points on the connection parts related to the tilting rotating operation or the steering rotating operation. Therefore, the backlash reduction design shape for the corresponding part will be described more specifically.

With reference to FIGS. 7 to 9, the clamping apparatus 1 for an antenna according to the embodiment of the present invention may hingedly connect the antenna device A, at two points, to the two steering rotation points S1 and S2, which are provided in the same upward/downward vertical directions, in order to enable a smooth steering rotation operation of the antenna device A, and the clamping apparatus 1 may also hingedly connect the antenna device A to form four tilting rotation points T1, T2, T3, and T4 provided in the different leftward/rightward horizontal line directions in order to enable a smooth tilting rotating operation of the antenna device A.

In this case, the rotation point S1 at the upper side among the two steering rotation points S1 and S2 is a hinge point about which the steering driving unit 200 to be described below is steered and rotated in the leftward/rightward direction, and the rotation point S2 at the lower side among the two steering rotation points S1 and S2 is a hinge point about which the lower end of the antenna installation bracket 90, to which the antenna device A is substantially coupled, is steered and rotated in the leftward/rightward direction, such that a more stable steering rotating operation of the antenna device A may be implemented.

More specifically, in order to implement the hinge connection with the steering driving unit 200 by means of the rotation point S1 at the upper side, steering hinge connection bolts 82 may be fitted with and fastened to the pair of upper vertical shaft mounting parts 81A from above and below in the upward/downward direction and thus be fastened to two opposite ends of a steering shaft 240 (FIG. 10A). The coupling of the steering hinge connection bolts 82 to the steering shaft 240 will be described below more specifically.

Meanwhile, as described above, among the four tilting rotation points T1, T2, T3, and T4, the rotation point T1 and the rotation point T2 serve as hinge points (a fixed point and a rotation point) about which the upper end of the antenna installation bracket 90, which mediates the coupling of the antenna device A by means of the rotational operations of the tilting link members 300A and 300B, is rotated.

Further, as described above, the rotation point T3 is a hinge point of the relative rotation between the tilting driving unit 100 and the steering driving unit 200.

Lastly, the rotation point T4 is a hinge point at which the lower end of the antenna installation bracket 90 is rotatably supported on the mounting rotation block 400 so that the antenna installation bracket 90, which mediates the coupling of the antenna device A, may be tilted and rotated, as described above.

More specifically, with reference to FIGS. 8A and 8B, the mounting rotation block 400 may include a rotation block body 410 having a rear end hingedly connected to the lower support bracket part 80B and a front end hingedly connected to the lower end (i.e., the lower horizontal bracket 98D) of the rear surface of the antenna installation bracket 90, a steering hinge cover 420 coupled to a lateral surface of the rear end of the rotation block body 410, and a tilting hinge cover 430 coupled to a lower surface of a front end of the rotation block body 410.

Further, the mounting rotation block 400 may further include steering hinge installation grooves 425A and 425B respectively processed as groove shapes opened toward the upper and lower sides of the rotation block body 410 and the steering hinge cover 420, and the upper and lower steering hinges 450U-1 and 450D-1 configured to support the steering rotation and interposed between the upper and lower steering hinge installation grooves 425A and 425B through upper and lower hinge installation holes 82*h*-U and 82*h*-D formed in the lower vertical shaft mounting part 81B.

In this case, the upper and lower steering hinge installation grooves 425A and 425B may be formed so that inner surfaces thereof have approximately circular cross-sections when the steering hinge cover 420 is coupled to the rotation block body 410. The upper and lower steering hinge installation grooves 425A and 425B may be processed as grooves with shapes in which diameters gradually increase toward the upper and lower sides. Therefore, the upper and lower steering hinge installation grooves 425A and 425B may each have a trapezoidal vertical cross-section with a length of a side corresponding to the inner surface that is relatively shorter than a length of a side corresponding to the outer end.

Further, the upper steering hinge 450U-1 and the lower steering hinge 450D-1 may be formed in shapes in which insertion portions inserted into the upper and lower steering hinge installation grooves 425A and 425B, except for portions fastened to the upper hinge installation hole 82*h*-U and the lower hinge installation hole 82*h*-D, are formed to correspond to and match with the processed groove shapes of the upper and lower steering hinge installation grooves 425A and 425B.

In this case, an upper steering hinge bushing 450U-2 and a lower steering hinge bushing 450D-2 may be respectively interposed between the upper steering hinge 450U-1 and the lower steering hinge 450D-1 and the upper and lower steering hinge installation grooves 425A and 425B.

Meanwhile, the mounting rotation block 400 may further include one side and the other side tilting hinge installation grooves 435A and 435B processed in groove shapes opened toward one side surface and the other side surface of the rotation block body 410 and one side surface and the other side surface of the tilting hinge cover 430, and one side tilting hinge 440L-1 and the other side tilting hinge 440R-1 configured to support the tilting rotation and interposed between one side and the other side tilting hinge installation grooves 435A and 435B through lower hinge holes 98D-1*h* formed at a pair of lower hinge connection ends 98D-1 of a lower horizontal bracket 98D.

In this case, one side and the other side tilting hinge installation grooves 435A and 435B may be formed so that inner surfaces thereof have approximately circular cross-sections when the tilting hinge cover 430 is coupled to the rotation block body 410. One side and the other side tilting hinge installation grooves 435A and 435B may be processed as grooves with shapes in which diameters gradually increase toward one side and the other side. Therefore, one side and the other side tilting hinge installation grooves 435A and 435B may each have a trapezoidal vertical cross-section with a length of a side corresponding to the inner surface that is relatively shorter than a length of a side corresponding to the outer end.

One side tilting hinge 440L-1 and the other side tilting hinge 440R-1 may be formed in shapes in which insertion portions inserted into one side and the other side tilting hinge installation grooves 435A and 435B, except for portions fastened to one side and the other side lower hinge holes 98D-1*h*, are formed to correspond to and match with the processed groove shapes of one side and the other side tilting hinge installation grooves 435A and 435B.

In this case, one side tilting hinge bushing 440L-2 and the other side tilting hinge bushing 440R-2 may be respectively interposed between one side tilting hinge 440L-1 and the other side tilting hinge 440R-1 and one side and the other side hinge installation grooves 435A and 435B.

In general, the bushing is a friction-consuming member interposed between two objects, which move relative to each other, and configured to serve to guide the coupling between the two objects or support motion characteristics between the two objects. In particular, in case that the bushing serves to support a rotary object with respect to a stationary object, a rectangular groove opened at one side thereof is typically processed in the stationary object, and then a part of the rotary object is inserted into the groove. Further, the bushing having a shape corresponding to the groove is manufactured and interposed between the portions inserted into the rotary object, such that it is possible to prevent the rotary object from coming into direct contact with an inner surface of the groove of the stationary object when the rotary object operates. Therefore, the bushing is generally formed in a hollow cylindrical shape with one closed end.

However, because one end of the bushing having the above-mentioned shape (i.e., the groove having the rectangular vertical cross-section) is closed, there is a problem in that it is difficult to cope with a tolerance in a direction of a rotation axis when an assembling tolerance occurs between the groove of the stationary object and the insertion portion of the rotary object.

Further, generally, an assembling tolerance is necessarily provided to manufacture components for smoothly assembling the components. In the present invention, in case that the bushing, which is provided to support the tilting rotation and the steering rotating operation to adjust the directionality of the antenna device A that is a predetermined weight member, is manufactured as the above-mentioned general type bushing having a rectangular groove shape and a predetermined assembling tolerance, there is a concern that the bushing is crushed and damaged or mechanical backlash noise is caused by a unique eccentric load applied by the tilting rotation and the steering rotation.

In the embodiment of the present invention, the mounting rotation block 400 may further include the backlash reduction design shape in order to prevent in advance the occurrence of mechanical backlash noise.

More specifically, the backlash reduction design shape is designed such that the shapes of the upper and lower steering hinge bushings 450U-2 and 450D-2, which are interposed between the upper and lower steering hinge installation grooves 425A and 425B, the upper steering hinge 450U-1, and the lower steering hinge 450D-1 related to the steering rotating operation of the antenna device A, have trapezoidal vertical cross-sections. Further, the backlash reduction design shape is designed such that the shapes of one side and the other side tilting hinge bushings 440L-2 and 440R-2, which are interposed between one side and the other side tilting hinge installation grooves 435A and 435B, one side tilting hinge 440L-1, and the other side tilting hinge 440R-1 related to the tilting rotating operation of the antenna device A, have trapezoidal horizontal cross-sections.

As described above, the principle of minimizing the occurrence of mechanical backlash noise caused by an eccentric load that is inevitably caused by the unique steering-rotating and tilting operations when the directionality of the antenna device A is adjusted because the antenna device A is a predetermined weight member will be described below briefly with reference to FIG. 9.

For reference, the mechanical backlash noise is understood as occurring at the steering rotation points S1 and S2 provided to support a load in the forward/rearward direction, i.e., the tilting direction of the antenna device A that is a predetermined weight member when the antenna device A is tilted and rotated. On the contrary, the mechanical backlash noise is understood as occurring at the tilting rotation points T1, T2, T3, and T4 provided to support a centrifugal force load in the leftward/rightward direction, i.e., the steering direction of the antenna device A that is a predetermined weight member when the antenna device A is steered and rotated.

With reference to FIG. 9, when the antenna device A of the mounting rotation block 400 is tilted and rotated in the forward/rearward direction, a load of the antenna device A, which is a weight member, is eccentrically applied to be biased forward on imaginary upper and lower straight lines formed by the steering rotation point S1 and S2 of the lower vertical shaft mounting part 81B.

In order to cope with the above-mentioned eccentric load applied when the directionality of the antenna device A is adjusted, the clamping apparatus 1 for an antenna according to the embodiment of the present invention is formed so that the shapes of the upper and lower steering hinge bushings 450U-2 and 450D-2 interposed between the upper and lower steering hinge installation grooves 425A and 425B, the insertion portions of the upper and lower steering hinges 450U-1 and 450D-1 inserted thereinto, and the upper and lower steering hinges 450U-1 and 450D-1, have trapezoidal cross-sections.

Therefore, even though an assembling tolerance is present between the upper steering hinge bushing 450U-2 and the lower steering hinge bushing 450D-2 interposed between the upper steering hinge 450U-1 and the lower steering hinge 450D-1 inserted and installed into the upper and lower steering hinge installation grooves 425A and 425B, it is possible to prevent a problem in which the rotation supporting function is eliminated when the bushings 450U-2 and 450D-2 is crushed in an elliptical shape. Further, it is possible to maintain the rotation supporting function as the bushings are transformed along surfaces inclined with respect to the steering rotation points S1 and S2 of the trapezoidal cross-section when the eccentric load is supported.

In addition, when the antenna device A is tilted, the eccentric load is consistent with the inclined surfaces of the upper and lower steering hinge installation grooves 425A and 425B, the upper and lower steering hinges 450U-1 and 450D-1, and the upper and lower steering hinge bushings 450U-2 and 450D-2 interposed therebetween, which may block the occurrence of mechanical backlash noise during the tilting operation.

FIGS. 10A and 10B are left and right exploded perspective views illustrating the tilting driving unit and the steering driving unit among the components of the clamping apparatus for an antenna according to the embodiment of the present invention.

With reference to FIGS. 10A and 10B, the clamping apparatus 1 for an antenna according to the embodiment of the present invention may include the tilting driving unit 100 and the steering driving unit 200 coupled to the front side of the extension bar assembly 60, the upper support bracket part 80A, or the lower support bracket part 80B that mediates the mounting of the antenna device A on the support pole P to adjust the directionality of the antenna device A.

The tilting driving unit 100 may include a tilting driving part housing 110 having an internal space 110S in which a tilting driving part 130 to be described below is embedded, and a tilting driving part housing cover 120 configured to close one opened side of the tilting driving part housing 110.

The tilting driving part housing covers 120 may be coupled to one opened end of the tilting driving part housing 110 by a plurality of cover assembling screws 125.

Tilting shaft connection holes 111*h* and 121*h* may be formed in the tilting driving part housing 110 and the tilting driving part housing cover 120 and communicate with the internal space 110S so that two opposite left and right ends of the tilting shaft 140, which is one of the components of the tilting driving part 130 to be described below are exposed to the outside.

The two opposite ends of the tilting shaft 140 exposed to the outside through the tilting shaft connection holes 111*h* and 121*h* may be connected to the tilting link members 300A and 300B and transmit tilting driving power, which is transmitted from a tilting drive motor 150 to be described below, to the tilting link members 300A and 300B.

Meanwhile, the steering driving unit 200 may include a steering lower housing 210 in which a steering driving part 230 to be described below is seated and coupled, and a steering upper housing 220 configured to cover and shield the steering driving part 230 seated on and coupled to the steering lower housing 210.

The steering upper housing 220 may be coupled to a rim upper end of the steering lower housing 210 disposed to cover an upper side of the steering lower housing 210 by a plurality of housing assembling screws 225.

Steering shaft connection holes (lower steering shaft connection hole is not illustrated, 221*h*) may be formed in the steering upper housing 220 and the steering lower housing 210 and communicate with a space (no reference numeral) in which the steering driving part 230 mounted therein is installed so that upper and lower ends of the steering shaft 240, which is one of the components of the steering driving part 230 to be described below, are exposed to the outside.

The two opposite ends of the steering shaft 240 exposed to the outside through the steering shaft connection hole (not illustrated, 221*h*) may be connected to the steering hinge connection bolt 82 provided on the upper vertical shaft mounting part 81A and steer and rotate the steering driving unit 200 by steering driving power transmitted from a steering drive motor 250 to be described below.

FIGS. 11A and 11B are exploded perspective views illustrating one side and the other side and illustrating a connection relationship between the tilting driving unit, the steering driving unit, and a tilting link member among the components of the clamping apparatus for an antenna according to the embodiment of the present invention, and FIG. 12 is a detailed exploded perspective view of FIG. 11A.

Meanwhile, with reference to FIGS. 10A and 10B, the tilting driving unit 100 and the steering driving unit 200 may be hingedly connected by the unit connection hinge 117 at a hinge center point corresponding to the rotation point T3.

To this end, hinge penetrating ends 113 and 123 may be respectively formed at two opposite left and right sides of an upper end of the tilting driving part housing 110 and an upper end of the tilting driving part housing cover 120, and hinge through-holes 114 and 124 may be respectively formed at the hinge penetrating ends 113 and 123, such that the pair of unit connection hinges 117 may be fastened. Hinge fastening ends 213 may be respectively formed at two opposite left and right sides of a lower end of the steering lower housing 210, a hinge fastening hole 214 may be formed at the hinge fastening end 213, and the unit connection hinge 117, which penetrates the hinge through-holes 114 and 124 of the hinge penetrating ends 113 and 123 may be fastened to the hinge fastening hole 214.

Meanwhile, the tilting shaft 140 and the steering shaft 240 are constituent elements that each serve as a driving power transmission part that enables the tilting rotating operations and the steering rotating operations of the tilting driving unit 100 and the steering driving unit 200 by receiving driving power from the tilting drive motor 150 and the steering drive motor 250. The tilting shaft 140 and the steering shaft 240 each also serve to support a load of the antenna device A, which is a weight member, in the tilting direction and the steering direction during the tilting rotating operation and the steering rotating operation of the antenna device A.

Therefore, the clamping apparatus 1 for an antenna according to the embodiment of the present invention may further include a design shape provided at a power connection point between the tilting shaft 140 and the steering shaft 240 to reduce the backlash.

More specifically, the design shape for reducing the backlash may be specifically implemented, as follows.

That is, there is also a concern that mechanical backlash noise occurs on the tilting shaft 140 and the steering shaft 240 when the directionality of the antenna device A is adjusted. In order to minimize the occurrence of the above-mentioned mechanical backlash noise, in the clamping apparatus 1 for an antenna according to the embodiment of the present invention, at least some of the end of the tilting shaft 140, the end of the steering shaft 240, the tilting link members 300A and 300B connected thereto, and vertical shaft mounting parts 81A and 81B may further include one side matching part 143 or 243 and the other side matching part 303 or 83 (see FIG. 4A in respect to reference numeral '83') each have a trapezoidal cross-section that is a surface inclined with respect to the rotation axis direction.

More specifically, one side matching part 143 may be formed on two opposite left and right end surfaces corresponding to the rotation point T1 of the tilting shaft 140 and have tooth surfaces and tooth troughs repeatedly formed, except for central portions, and caught in a circumferential direction. A bolt fastening hole 145 may be formed in a center portion of one side matching part 143 so that a link assembling bolt 305 for assembling, by bolting, the tilting link members 300A and 300B is inserted and fastened into the bolt fastening hole 145.

Further, the other side matching part 303 may be formed on the inner surface corresponding to the rotation point T1 of the tilting link members 300A and 300B and have tooth surfaces and tooth troughs repeatedly formed, except for central portions, and caught in the circumferential direction. A bolt through-hole 301 penetrated by the link assembling bolt 305 may be formed in a center portion of the other side matching part 303.

Meanwhile, one side matching part 243 may be formed on upper-end and lower-end surfaces corresponding to the rotation points S1 and S2 of the steering shaft 240 and have tooth surfaces and tooth troughs repeatedly formed, except for central portions, and caught in the circumferential direction. A bolt fastening hole 245 may be formed in a center portion of one side matching part 243 so that the hinge connection bolt 82 assembled, by bolting, to the pair of upper vertical shaft mounting parts 81A is inserted and fastened into the bolt fastening hole 245.

Further, the other side matching part 83 may be formed on lower and upper surface portions corresponding to the rotation points S1 and S2 of the pair of upper vertical shaft mounting parts 81A and have tooth surfaces and tooth troughs repeatedly formed, except for central portions, and caught in the circumferential direction. A bolt through-hole (no reference numeral) penetrated by the above-mentioned hinge connection bolt 82 may be formed in a center portion of the other side matching part 83.

In this case, the tooth surfaces and the tooth troughs respectively formed on one side matching part 143 or 243 and the other side matching part 303 or 83 securely match (engage) with each other by means of the link assembling bolt 305 and the hinge connection bolt 82 so that the driving power may be transmitted in the tilting rotation direction and the steering rotation direction. Further, the tooth surfaces and the tooth troughs each have a trapezoidal cross-section that is an inclined surface, which may prevent in advance the occurrence of mechanical backlash noise.

The above-mentioned feature of preventing the occurrence of mechanical backlash noise by means of the shape structures of one side matching part 143 or 243 and the other side matching part 303 or 83 is not applied only to the coupling structure between the tilting link members 300A and 300B and the tilting shaft 140 and the coupling structure between the upper vertical shaft mounting part 81A and the steering shaft 240. That is, as described below more specifically, in order to implement the feature of preventing the occurrence of mechanical backlash noise, the feature may be applied, in an intact manner, to the installation structures of the tilting drive motor 150 of the tilting driving unit 100 and the steering drive motor 250 of the steering driving unit 200.

FIGS. 13A and 13B are exploded perspective views illustrating one side and the other side and illustrating the tilting driving unit among the components of the clamping apparatus for an antenna according to the embodiment of the present invention.

With reference to FIGS. 13A and 13B, the tilting driving unit 100 may further include the tilting drive motor 150 configured to operate electrically, and a transmission gear assembly 160 configured to receive driving power from the tilting drive motor 150 and transmit the driving power to the tilting shaft 140.

The tilting drive motor 150 and the transmission gear assembly 160 may be stably installed in the internal space 110S of the tilting driving part housing 110 by means of a unit installation frame 180.

In particular, the transmission gear assembly 160 may be installed to be physically separated the other constituent elements and installed in the internal space 110S by a gearbox housing 192 coupled by a plurality of box fixing bolts 195 to cover an upper side of a gearbox base 191 after a plurality of gears is axially installed stably on an upper surface provided by the gearbox base 191.

In this case, the transmission gear assembly 160 may include a first transmission gear 161 configured to serve as an input gear provided to engage with a motor worm gear 151 connected to a rotary shaft of the tilting drive motor 150, a second transmission gear 162 configured to engage with the first transmission gear 161, a third transmission gear 163 configured to engage with the second transmission gear 162, a fourth transmission gear 164 configured to engage with the third transmission gear 163, and a fifth transmission gear 170 configured to serve as an output gear provided to engage with the fourth transmission gear 164.

The first to fifth transmission gears 161, 162, 163, 164, and 170 are each formed as a two-stage gear having different diameters so that an engagement portion of an input portion and an engagement portion of an output portion are different from each other in terms of a power transmission order, and gear engagement ratios of all the five transmission gears 161, 162, 163, 164, and 170 are different from one another, such that power may be converted at an appropriate reduction speed and a reduction ratio in comparison with a usage capacity of the tilting drive motor 150 and transmitted to the tilting shaft 140.

In particular, the first transmission gear 161 serves as an input gear, and the motor worm gear 151 is provided as a worm gear type connected to the rotary shaft of the tilting drive motor 150, such that at least one of the two-stage gears of the first transmission gears 161 may be employed as a worm wheel gear type gear that easily engages with the worm gear. The fifth transmission gear 170 serves as an output gear, and a gear shape connected to an outer peripheral surface of the tilting shaft 140 is provided as a tilting shaft worm wheel gear 141 that is a worm wheel gear type, as described below, such that at least one of the two-stage gears of the fifth transmission gears 165 may be employed as a worm gear type gear that easily engages with the worm wheel gear.

The tilting shaft worm wheel gear 141 may engage with rack gear teeth 171 of the five transmission gears, which engage with the outer peripheral surface of the fifth transmission gear 170, and receive power.

In this case, in order to implement smooth driving power transmission through the configuration in which one side matching part 143 and the other side matching part 303 match with the pair of tilting link members 300A and 300B, the tilting shaft 140 may be disposed horizontally leftward and rightward in the internal space 110S in the tilting driving part housing 110, the transmission gear assembly 160 may be disposed to have a rotation axis in an approximately upward/downward direction, and the tilting drive motor 150 may be disposed horizontally leftward and rightward so as to have a rotation axis parallel to the tilting shaft 140.

Further, a motor control board 185 may be installed on a rear portion of the internal space 110S of the tilting driving part housing 110 by means of a board fixing bracket 186.

Meanwhile, a tilting part damper (not illustrated) may be further provided between the tilting drive motor 150 and an inner surface of the tilting driving part housing 110. The tilting part damper serves to prevent the occurrence of mechanical backlash noise by attenuating an operating reaction force transmitted reversely from the antenna device A, which is a weight member, in accordance with the tilting operation of the tilting drive motor 150. As described below, because the tilting part damper is identical in configuration and operational effect to a steering damper 500 to be described below, the tilting part damper will be described more specifically when the steering damper 500 is described.

FIG. 14 is an exploded perspective view of the steering driving unit among the components of clamping apparatus for an antenna according to the embodiment of the present invention, FIG. 15 is a perspective view illustrating a transmission gear assembly in a state in which a gear housing is removed among the components in FIG. 14, and FIG. 16 is a top plan view illustrating a state in which an upper housing of the steering unit is removed among the components in FIG. 14.

With reference to FIGS. 14 to 16, the steering driving unit 200 may further include the steering drive motor 250 configured to operate electrically, and a transmission gear assembly 260 configured to receive driving power from the steering drive motor 250 and transmit the driving power to the steering shaft 240.

The steering drive motor 250 and the transmission gear assembly 260 may be stably installed by means of a unit installation frame (not illustrated) in an internal space between the steering lower housing 210 and the steering upper housing 220.

In particular, the transmission gear assembly 260 may be installed to be physically separated from the other constituent elements and installed in the internal space by a gearbox housing 292 coupled by a plurality of box fixing bolts 295 to cover a lateral side of a gearbox base 291 after a plurality of gears is axially installed stably on an lateral surface provided by the gearbox base 291 disposed in the upward/downward direction.

In this case, because the driving power transmission mechanism for the components (i.e., the first to fifth transmission gears 261, 262, 263, 264, and 270 and the motor worm gear 251) of the transmission gear assembly 260 and the steering shaft 240 is significantly identical to a driving power transmission mechanism for the transmission gear assembly 160 and the tilting shaft 140 described with reference to the tilting driving unit 100, except for a difference in directions, a detailed description thereof will be omitted.

Meanwhile, the steering damper 500 may be further provided in a backlash reduction design shape between the steering drive motor 250 and the inner surface of the steering upper housing 220. The steering damper 500 may serve to prevent the occurrence of mechanical backlash noise by attenuating an operating reaction force transmitted reversely from the antenna device A, which is a weight member, in accordance with the steering operation of the steering drive motor 250.

More specifically, with reference to FIGS. 14 and 15, the steering damper 500 may be disposed between the inner surface of the steering upper housing 220 and an upper end of the steering drive motor 250 based on a direction opposite to a lower end of the steering drive motor 250 to which the rotary shaft is connected.

The steering damper 500 may include an installation gasket 510 interpreted at the lower end of the steering drive motor 250, a lower damper 520 fixed to an installation protrusion 252 of the steering drive motor 250 penetrating a through-hole 510*h* of the installation gasket 510, and an upper damper 530 having a lower end that overlaps and matches with a part of an upper end of the lower damper 520.

The lower damper 520 has tooth surfaces (see reference numeral '521') and tooth troughs (see reference numeral '522') repeatedly formed in the circumferential direction, and the portion, which forms the tooth surface 521, may overlap and match with a part of the upper damper 530.

The upper damper 530 has a through-hole 530*h* formed in the upper surface portion and penetrated and fastened by a fixing protrusion (not illustrated) formed on the inner surface of the steering upper housing 220. Tooth surfaces (see reference numeral '531') and tooth troughs (see reference numeral '532') may be repeatedly formed on the lower surface portion in the circumferential direction, and the portion, which forms the tooth surface 531, may be inserted into and matched with the tooth trough 522 of the lower damper 520.

The steering damper 500 configured as described above serves to prevent the occurrence of mechanical backlash noise of the steering drive motor 250 by attenuating an eccentric load of the antenna device A, which is a weight member, when the tilting rotation is adjusted in the forward/rearward direction in accordance with the tilting rotation of the antenna device A and when the directionality is adjusted in the leftward/rightward direction in accordance with the steering rotation. This may be understood as an operational effect that is applied in an intact manner even in case that a tilting damper (not illustrated) is provided without a specific description.

The clamping apparatus 1 for an antenna according to the embodiment of the present invention provides the technical feature for minimizing or preventing the occurrence of mechanical backlash noise that may occur when the directionality of the antenna device A, which is a weight member, is adjusted as described above, in which 1) the position of the tilting rotation point T3 directly related to the tilting-rotating is effectively designed and applied, 2) the shape design of the components related to the hinges of the mounting rotation block 400, which mediates the installation of the antenna installation bracket 90 on the lower vertical shaft mounting part 81B, is modified and applied, 3) the design of the surrounding components connected to the tilting shaft 140 and the steering shaft 240 is modified and applied, and 4) the design of the connection part between the tilting drive motor 150 and the steering drive motor 250 is modified and applied.

Further, with reference to FIG. 16, assuming that a tilting force is applied in a forward/rearward direction (F-R) when the antenna device A is tilted and rotated in the clamping apparatus 1 for an antenna according to the embodiment of the present invention, an axial direction E of a worm gear 271 of a fifth transmission gear 270 configured to engage with a worm wheel gear 241 of the steering shaft 240 may be inclined slightly rearward from one side or the other side with respect to the leftward/rightward horizontal direction.

In case that the worm wheel gear 241 of the steering shaft 240 and the worm gear 271 of the fifth transmission gear 270 engage with each other orthogonally to the tilting direction of the forward/rearward direction (F-R), the mechanical backlash noise is reduced when the antenna device A is steered and rotated, but the effect of reducing the occurrence of mechanical backlash noise when the antenna device A is tilted and rotated may deteriorate.

FIG. 17 is a perspective view illustrating a state in which a direction is set in accordance with a tilting rotation and/or a steering rotation of the antenna device by using the clamping apparatus for an antenna according to the embodiment of the present invention.

FIG. 17A illustrates a state in which the antenna device A installed on the support pole P by the clamping apparatus 1 for an antenna according to the embodiment of the present invention is mounted on the support pole P before the directionality is adjusted in the tilting rotation and the steering rotation.

In this case, with reference to FIG. 17B, the user may perform the tilting rotation by operating the tilting drive motor 150 of the tilting driving unit 100 in case that the directionality is completely performed only by the tilting rotating rotation of the antenna device A.

In addition, with reference to FIG. 17C, the user may perform the steering rotation by operating the steering drive motor 250 of the steering g driving unit 200 when the directionality is completely adjusted only by the steering rotating operation of the antenna device A.

Further, with reference to FIG. 17D, when the tilting rotating operation and the steering rotating operation of the antenna device A are simultaneously required to adjust the directionality, the user may adjust the directionality of the antenna device A in a desired direction by operating the tilting drive motor 150 of the tilting driving unit 100 and the steering drive motor 250 of the steering driving unit 200 for a predetermined time.

The clamping apparatus 1 for an antenna according to the embodiment of the present invention has been described in detail with reference to the accompanying drawings. However, the present invention is not necessarily limited by the embodiments, various and modifications of the embodiments and any other embodiments equivalent thereto may of course be carried out by those skilled in the art to which the present invention pertains. Accordingly, the true protection scope of the present invention should be determined by the appended claims.

INDUSTRIAL APPLICABILITY

The present invention provides the clamping apparatus for an antenna, in which the antenna device may be tilted and rotated in the upward/downward direction and simultaneously steered and rotated in the leftward/rightward direction, the rotation range in each of the directions may be maximally ensured, and the user may selectively provide the extension bar assembly to suit the number of antenna devices installed on the support pole and the installation space, such that in order to enable the tilting rotation and the steering rotation, it is possible to prevent the occurrence of mechanical backlash noise from each of the connection parts when the antenna direction adjustment including the tilting rotation and the steering rotation of the antenna device, which is a comparatively heavy weight member, is performed, and the antenna devices are intensively installed to form the two steering rotation points based on the antenna installation bracket to enable the miniaturized design of the product.

The invention claimed is:

1. A clamping apparatus for an antenna, the clamping apparatus comprising:

fixing bracket parts provided at upper and lower sides of a support pole to mediate installation of an antenna device on the support pole;

an antenna installation bracket configured to mediate installation of the antenna device at a front side;

a steering driving unit connected to the fixing bracket part and configured to operate to steer and rotate the antenna device; and a tilting driving unit having an upper end hingedly connected to the steering driving unit and a lower end hingedly connected to an upper end of a rear surface of the antenna installation bracket by means of a pair of tilting link members, the tilting driving unit being configured to tilt and rotate the antenna device, wherein the clamping apparatus further comprises a backlash reduction design shape for reducing the occurrence of mechanical backlash noise caused by an eccentric load of the antenna device.

2. The clamping apparatus of claim 1, wherein the fixing bracket parts comprise:

an upper fixing bracket part provided on the support pole; and a lower fixing bracket part provided on the support pole and provided below the upper fixing bracket part.

3. The clamping apparatus of claim 2, wherein the backlash reduction design shape is provided as an inclined surface on a mounting rotation block that mediates hinge connection so as to be tilting rotatable and steering rotatable relative to the lower support bracket part installed on the support pole while corresponding to the lower fixing bracket part.

4. The clamping apparatus of claim 3, wherein the backlash reduction shape has a trapezoidal cross-section including the inclined surface at least being in surface contact with a steering hinge bushing interposed between steering hinges inserted into steering hinge installation groove provided at a hinge connection point of the mounting rotation block.

5. The clamping apparatus of claim 4, wherein the steering hinge installation groove is processed in a groove shape with opened upper and lower sides so that an upper steering hinge and a lower steering hinge are interposed by means of an upper vertical shaft mounting part and a lower vertical shaft mounting part formed on the lower support bracket part.

6. The clamping apparatus of claim 4, wherein the mounting rotation block comprises:

a rotation block body having a rear end hingedly connected to the lower support bracket part and a front end hingedly connected to a lower end of a rear surface of the antenna installation bracket; and a steering hinge cover to which a lateral surface of a rear end of the rotation block body is coupled, and wherein the steering hinge installation groove is formed so that an inner surface thereof has a circular cross-section when the steering hinge cover is coupled to the rotation block body.

7. The clamping apparatus of claim 3, wherein the backlash reduction design shape has a trapezoidal cross-section including the inclined surface at least being in surface contact with a tilting hinge bushing interposed between tilting hinges inserted into a tilting hinge installation groove provided at a hinge connection point of the mounting rotation block.

8. The clamping apparatus of claim 7, wherein the tilting hinge installation groove is processed in a groove shape opened toward one side surface and the other side surface so that one side tilting hinge and the other side tilting hinge are interposed through a lower horizontal bracket provided at a lower end of the antenna installation bracket.

9. The clamping apparatus of claim 4, wherein the mounting rotation block comprises:

a rotation block body having a rear end hingedly connected to the lower support bracket part and a front end hingedly connected to a lower end of a rear surface of the antenna installation bracket; and a tilting hinge cover coupled to a lower surface of a front end of the rotation block body, and wherein the tilting hinge installation groove is formed so that an inner surface thereof has a circular cross-section when the tilting hinge cover is coupled to the rotation block body.

10. The clamping apparatus of claim 1, wherein the backlash reduction design shape comprises:

one side matching part formed at each of two opposite ends of a tilting shaft of the tilting driving unit; and the other side matching part formed at an end of the tilting link member coupled to the tilting shaft, and wherein the backlash reduction design shape has a trapezoidal cross-section in which a tooth surface, which is caught in a rotation direction, includes an inclined surface.

11. The clamping apparatus of claim 2, wherein the backlash reduction design shape comprises:

one side matching part formed at each of two opposite ends of a steering shaft of the steering driving unit; and the other side matching part formed on an upper support bracket part installed on the support pole while corresponding to the upper fixing bracket part so as to be coupled to the steering shaft, and wherein the backlash reduction design shape has a trapezoidal cross-section in which a tooth surface, which is caught in a rotation direction, includes an inclined surface.

12. The clamping apparatus of claim 1, wherein the backlash reduction design shape comprises:

a tilting damper interposed between an inner surface of a tilting driving part housing of the tilting driving unit and a tilting drive motor; and an inclined surface configured to interfere, in a tilting rotation direction or a steering rotation direction, with a steering damper interposed between an inner surface of a steering upper housing of the steering driving unit and a steering drive motor.

13. The clamping apparatus of claim 1, wherein the steering driving unit comprises:

a steering drive motor configured to operate electrically;

a steering shaft disposed vertically upward and downward; and a transmission gear assembly configured to receive driving power from the steering drive motor and transmit the driving power to the steering shaft, and wherein a transmission gear of the transmission gear assembly, which engages with the steering shaft, is disposed to be inclined forward or rearward at a predetermined angle so as not to be orthogonal to a tilting rotation direction of a forward/rearward direction of the antenna device.

* * * * *